US012576503B2

(12) United States Patent
Tulodziecki et al.

(10) Patent No.: US 12,576,503 B2
(45) Date of Patent: Mar. 17, 2026

(54) CONNECTION ASSEMBLY FOR A HAND-GUIDED MACHINE TOOL AND HAND-GUIDED MACHINE TOOL

(71) Applicant: Festool GmbH, Wendlingen (DE)

(72) Inventors: Stefan Tulodziecki, Neuhausen A.d.F. (DE); Hans-Peter Albrecht, Wendlingen (DE)

(73) Assignee: Festool GmbH, Wendlingen (DE)

( * ) Notice: Subject to any disclaimer, the term of this patent is extended or adjusted under 35 U.S.C. 154(b) by 1061 days.

(21) Appl. No.: 17/414,358

(22) PCT Filed: Jul. 30, 2020

(86) PCT No.: PCT/EP2020/071600

§ 371 (c)(1),
(2) Date: Jun. 16, 2021

(87) PCT Pub. No.: WO2021/089207

PCT Pub. Date: May 14, 2021

(65) Prior Publication Data

US 2022/0040838 A1 Feb. 10, 2022

(30) Foreign Application Priority Data

Nov. 5, 2019 (DE) ..................... 10 2019 129 824.5

(51) Int. Cl.
*B25F 5/02* (2006.01)
*B24B 7/18* (2006.01)

(52) U.S. Cl.
CPC ................ *B25F 5/02* (2013.01); *B24B 7/184* (2013.01); *Y10T 403/595* (2015.01)

(58) Field of Classification Search
CPC . B24B 7/184; Y10T 403/595; Y10T 403/608; Y10T 403/59; Y10T 403/591;
(Continued)

(56) References Cited

U.S. PATENT DOCUMENTS 2,681,807 A * 6/1954 Krafft ..................... B61G 7/02 285/902
3,024,051 A * 3/1962 Hullinger ............ G21C 19/105 376/233

(Continued)

FOREIGN PATENT DOCUMENTS

CN 106956174 A 7/2017
DE 29508203 U1 8/1995

(Continued)

OTHER PUBLICATIONS

EP 1970168 A1, Festool GmbH, Operating handle for a manually operated machine tool, Sep. 17, 2008, Google Patents Translation (Year: 2008).*

(Continued)

*Primary Examiner* — Amber R Anderson
*Assistant Examiner* — Zachary A Hall
(74) *Attorney, Agent, or Firm* — ArentFox Schiff LLP

(57) ABSTRACT

A connection assembly for connecting a tool head and a further machine module of a hand-guided machine tool wherein the connection assembly includes at least two connection parts following one another along a longitudinal axis and each having a connection section via which the connection parts are connectable to one another.

29 Claims, 17 Drawing Sheets

(58) Field of Classification Search
CPC ............. Y10T 403/593; Y10T 403/599; Y10T 403/602; Y10T 403/60; A47L 9/242; A47L 9/246; B25G 1/04
USPC .................................. 15/176.1, 176.6, 143.3
See application file for complete search history.

(56) References Cited

U.S. PATENT DOCUMENTS

| | | | | | |
|---|---|---|---|---|---|
| 3,526,040 | A * | 9/1970 | Young | G01B 3/08 33/809 |
| 3,967,909 | A * | 7/1976 | Deeter | F16D 1/108 403/328 |
| 5,172,998 | A * | 12/1992 | Hatagishi | H01R 13/62955 439/157 |
| 5,466,102 | A * | 11/1995 | Erickson | B23B 29/046 409/234 |
| 6,672,792 | B1 * | 1/2004 | Schipani | F16B 7/042 52/584.1 |
| 9,599,261 | B2 * | 3/2017 | Schimanski | F16L 21/035 |
| 9,848,511 | B2 * | 12/2017 | Umeno | H05K 5/006 |
| 10,893,784 | B2 * | 1/2021 | Majer | A47L 7/0095 |
| 12,178,311 | B2 * | 12/2024 | Knight | A47L 11/40 |
| 12,220,803 | B2 * | 2/2025 | Allgaier | B25F 5/026 |
| 2006/0048397 | A1 | 3/2006 | King et al. | |
| 2013/0142563 | A1 | 6/2013 | Sumi et al. | |
| 2017/0172362 | A1 | 6/2017 | Reimer et al. | |
| 2023/0001532 | A1 * | 1/2023 | Miller | B24B 7/184 |

FOREIGN PATENT DOCUMENTS

| | | | | |
|---|---|---|---|---|
| DE | 202006010155 | U1 | 10/2006 | |
| DE | 102006050816 | A1 | 4/2008 | |
| DE | 102007012394 | A1 | 9/2009 | |
| DE | 102015207151 | A1 | 10/2016 | |
| EP | 1289032 | A1 | 3/2003 | |
| EP | 1634679 | A2 | 3/2006 | |
| EP | 1961524 | A2 * | 8/2008 | B23Q 11/0046 |
| EP | 1970168 | A1 | 9/2008 | |
| EP | 2954977 | A1 | 12/2015 | |
| EP | 3120977 | A1 | 1/2017 | |
| GB | 2592572 | A * | 9/2021 | B24B 23/028 |

OTHER PUBLICATIONS

German Office Action, Application DE 10 20190129 824.5, pp. 1-6.
International Search Report and Non-Translated Written Opinion Form PCT/IS/210 and PCT/ISA/237, International Application No. PCT/EP2020/071600 pp. 1-7, International Filing Date Jul. 30, 2020, mailing date of report Oct. 23, 2020.

* cited by examiner

Detail A:

CONNECTION ASSEMBLY FOR A HAND-GUIDED MACHINE TOOL AND HAND-GUIDED MACHINE TOOL

CROSS-REFERENCE TO RELATED APPLICATIONS

This is a National Stage Application filed under 35 U.S.C. 371 based on International Patent Application No. PCT/EP2020/071600, filed on Jul. 30, 2020, which claims priority to German Patent Application No. 10 2019 129 824.5 filed on Nov. 5, 2019, the disclosures of both of which are incorporated herein by reference in their entireties.

BACKGROUND

The invention relates to a connection assembly, a machine tool, and an extension piece.

Machine tools are known from the prior art, for example from DE 10 2007 012 394 A1 from the applicant. This document describes a hand-guided machine tool comprising a handle bar which has a plurality of handle bar parts that are connectable to one another by means of a clamping device. The length of the handle bar can thus be changed to adapt the machine to the task at hand and the handle bar can be dismantled for transport purposes. This makes the machine tool easier to handle.

After a certain period of use, however, it is necessary to readjust the clamping device due to wear. In addition, several hand movements are required for connecting and detaching the handle bar parts. For example, the handle bar parts have to be brought together for connection and held in this position in order to then bring the two tie rods into engagement with parts for engagement from behind and clamp said tie rods and engagement parts by means of the two manual operating levers. In addition, the electrical connector plug has to be attached to plug contacts. Disassembly takes place in the reverse order, with several hand movements also being required for this. In this respect, there is potential for optimization.

The object of the invention is to facilitate the handling of a hand-guided machine tool, in particular its assembly and disassembly, using simple structural means. It is also desirable to keep the readjustment effort as low as possible.

SUMMARY OF THE INVENTION

The invention achieves this object by means of a connection assembly characterized in that inside the cross section of the connection section of a first of the connection parts a mechanical clamping element (e.g. a clamping claw) is arranged and inside the cross section of the connection section of the other connection part a mechanical counter element (e.g. a hook) is arranged. An actuatable clamping device that acts on the clamping element is provided on the connection section of the first connection part. The clamping element and the counter element are configured in such a way that they can be or are brought into engagement with one another when the connection sections are plugged together. By actuating the clamping device, the connection parts are braceable against one another when the clamping element is in engagement with the counter element.

Such a configuration contributes to a space-saving transmission of force, since the clamping connection (clamping element and counter element) is not arranged outside, but rather inside, the cross section of the connection parts (internal clamping connection). This makes the connection assembly and the machine tool easier to handle and transport. The internal arrangement of the clamping element and counter element can reduce contamination and wear of these components. The clamping element and the counter element can each have a hook-shaped profile.

The machine tool that is equipped with such a connection assembly can be, for example, a hand-guided machine tool. Irrespective of this, the connection assembly can be a connection line, for example a hose or a pipe. The connection parts can have, for example, a pipe section, a connection section being formed at one end or at both ends of the pipe section.

The further machine module can be a handle part. Optionally, the handle part can have display elements and/or operating elements for monitoring or operating the machine tool, respectively. The (inner) cross section of the connection parts can be, for example, an inner chamber.

In a preferred embodiment, the connection parts can be detachably connectable to each other. The connection assembly can thus be assembled or disassembled in a simple manner. For example, the connection assembly can be assembled for use of the machine tool and disassembled for transport or storage.

Advantageously, the clamping device can have a manually operable clamping lever as the actuating device and be configured in such a way that, for clamping the connection parts (clamping two adjacent connection parts) via the clamping element and counter element, only this clamping lever has to be operated.

This makes handling of the connection assembly easier, since only the clamping lever has to be actuated to lock or unlock two connection parts (single-lever actuation or locking). This means that the number of operating elements is low. Only a few hand movements are required for assembling and disassembling the connection assembly, which assembly and disassembly can be carried out by one user alone.

Expediently, the clamping element can be rotatably mounted on the clamping device and is biased relative to the counter element, so that the clamping element and the counter element automatically engage with each other when the connection sections are plugged together. Therefore, the clamping element and the counter element automatically engage with each other, preferably behind each other, when the connection sections are plugged together. The connection parts are thus secured to one another, even if they are not yet clamped by means of the clamping device. This increases safety during handling, since the risk of damage and the risk of injury are reduced. A spring element, which acts on the clamping element for example, can be provided for biasing. The spring element can be a compression spring.

Specifically, the clamping element can be fixed to the first connection part and/or the counter element can be fixed to the second connection part by means of a transverse bolt respectively, wherein the transverse bolt projects transversely or obliquely to the longitudinal axis through the cross section of the respective connection part and engages with its ends in a recess formed in the wall of the connection part or in a passage formed in the wall of the connection part respectively. The clamping element and counter element are thus connected to the respective connection parts in a stable manner. The transverse bolt allows force to be transmitted reliably, even with comparatively soft materials for the connection part. For example, the connection parts can be made of aluminum. The transverse bolt can be designed as a (tubular) sleeve. The transverse bolt can be oriented radially in the connection part.

Expediently, the clamping device can comprise a bearing part which wraps around the transverse bolt of the first connection part and defines a bearing point spaced from the transverse bolt and having a bearing axis oriented obliquely or orthogonally to the central longitudinal axis of the transverse bolt. This means that a bearing axis is provided in a space-saving manner and in a manner which is favorable in terms of the force path. The bearing part can be designed as a bearing plate. For reasons of stability, the bearing plate can preferably have a U-shaped cross section.

In a preferred embodiment, the clamping lever can be pivotably mounted on the bearing point of the bearing part via a lever shaft, wherein the clamping element is coupled to the lever shaft by means of an eccentric. This makes it possible to apply high forces to the clamping element and the counter element, which may be in engagement with the clamping element, in a structurally simple and cost-effective manner.

Optionally, at the connection section of the first connection part a manually operable pushbutton can be provided, which pushbutton acts on the clamping element, wherein by operating the pushbutton the clamping element and the counter element can be disengaged (when the clamping device is released). In this way, the risk of injury to the user and the risk of damage to the machine tool are reduced. Therefore, the pushbutton has to be pressed in order to bring the clamping element and the counter element out of engagement. If the clamping lever is (accidentally) actuated (the clamping device is detached), the connection parts can be prevented from detaching from one another unintentionally, since the pushbutton has to be operated in order for this to occur.

Alternatively or additionally, the clamping device can be configured in such a way that, after the clamping element has been released, the clamping lever can be moved further in the opening direction in order to disengage the clamping element and the counter element (when the clamping device is released). In this way too, the connection parts can be prevented from detaching from one another unintentionally. Such a configuration requires comparatively few components and operating elements.

Advantageously, the counter element can be displaceably guided on the second connection part and can be mounted on the second connection part or on the connection section of the second connection part by interposition of a spring. This provides for structural tolerance compensation, with the spring compensating for any tolerances. Readjustment due to wear is therefore no longer required. The direction of force of the spring is oriented along or in parallel with the longitudinal direction of the relevant connection part. The spring can be positioned, for example, between a protrusion of the counter element and the transverse bolt. The spring can be, for example, a compression spring.

Expediently, the counter element can be coupled to or merge with a retaining portion, wherein the retaining portion comprises an angled portion, and wherein the spring can be arranged between the angled portion and the transverse bolt on the second connection part. This results in a structurally simple and stable coupling of the spring, counter element and transverse bolt with few components. This results in an overall favorable configuration of the tolerance compensation.

In a preferred embodiment, on the connection section of the first connection part a projection can be formed that, when the clamping lever is in the position in which the clamping element is braced, adjoins a free end of the clamping lever, in particular continues its contour. Therefore, the risk of accidentally opening the clamping lever can be significantly reduced by the projection. The projection can be designed as a lug. The free end of the clamping lever faces away from the bearing axis.

Advantageously, an electrical plug connector and/or a connection opening to a flow channel formed in the respective connection part can be arranged on the connection sections respectively, wherein the plug connector and/or the connection opening are arranged within the cross section of the respective connection section. In this way, simple coupling of the interfaces is made possible, since only the connection parts or their connection sections have to be plugged together for said coupling to occur. This makes handling easier and contributes to a space-saving design. The arrangement within the cross section reduces contamination and wear. The plug connector can be designed as a multi-pole connector, for example with two or more poles (multi-wire).

Optionally, the plug connector, the clamping element and the counter element and/or the connection opening can be arranged flush with or inwardly offset relative to the end face of the respective connection section. In other words, these elements do not protrude from the end face of the relevant connection section. This reduces the risk of injury or wear. In addition, this provides a certain degree of protection from environmental influences.

Expediently, at least one of the plug connectors can be mounted on the connection section or on the connection part via an elastic element respectively, in particular in such a way that the plug connector(s) is/are movable relative to the connection section or to the connection part. The plug connectors thus have a certain amount of play so that the connection parts can always be plugged together.

Specifically, the plug connector can be returnable by the elastic element into a, preferably central, initial position. This creates a defined initial position. If the plug connector rotates off-center, it can be returned into the initial position by means of the return element.

In a preferred embodiment, one or more dust removal openings can be formed in the plug connector, in particular adjacent to its plug contacts. This reduces the risk of dust deposits that impair the function of the electrical plug connectors. The dust removal openings can be flow-connected to the flow channel (suction channel) formed in the relevant connection part by means of a flow connection.

Advantageously, the connection section of the first connection part can have a collar projecting parallel to the longitudinal axis, with which collar the connection section of the first connection part encompasses the connection section of the other connection part when plugged together. Plugging together is thus simplified, since the connection sections are guided through the collar. The interfaces of the connection sections can thereby be aligned with one another. The collar contributes to the protection of the interfaces of the connection sections from environmental influences. The collar is preferably designed to be an all-around collar.

Expediently, a further connection part can be provided, which has a connection section at both ends respectively in such a way that the further connection part can be inserted as an extension piece between the first and the second connection part and can be detachably connected thereto. The length of the connection assembly and the hand-guided machine tool can thus be adjusted as required. Inserting the further connection part provides for a lengthening and removing the connection part provides for a shortening.

The object mentioned at the outset is also achieved by a preferably hand-guided machine tool having the features of the additional independent claim. The machine tool has a tool head, a further machine module and a connection assembly for connecting the tool head and the machine module as described above. The hand-guided processing machine can be a surface finishing machine, for example a long-neck sander. The tool head can be designed as a grinding head, for example. The further machine module can be a handle part, for example.

With regard to the advantages that can be achieved with the machine tool, reference is made to the relevant statements regarding the connection assembly. The measures described in connection with the connection assembly can be used to further develop the machine tool.

The object mentioned at the outset is also achieved by an extension piece for a connection assembly having the features of the other additional independent claim. The extension piece constitutes a further extension part for a connection assembly, as described above.

The extension piece has in particular at both ends a respective connection section, so that the extension piece can be inserted between the two connection parts and connected thereto for the purpose of lengthening. With regard to the advantages that can be achieved with the extension piece, reference is made to the relevant statements regarding the connection assembly.

Advantageously, the extension piece for a connection assembly can be used to connect a tool head and a further machine module of a hand-guided machine tool. The extension piece has at both ends a respective connection section, via which the extension piece is connectable to a connection part of the connection assembly respectively, wherein the connection sections of the extension piece each delimit an inner cross section (e.g. inner chamber) toward the outside. The extension piece is characterized in that inside the cross section of the first connection section a mechanical clamping element (e.g. clamping claw) is arranged and inside the cross section of the second connection section a mechanical counter element (e.g. hook) is arranged, wherein on the first connection section an actuatable clamping device is provided that acts on the clamping element. In this way, the extension piece as a (further) connection part can be connected to a connection part just as advantageously as the connection parts of the connection assembly described above.

In a preferred embodiment, the clamping element can be configured such that, when the first connection section is plugged together with a connection section of a (further) connection part of the connection assembly, the clamping element is engageable with a counter element of the connection section, wherein, by actuating the clamping device, the extension piece and the connection part are braceable against one another when the clamping element is in engagement with the counter element. This makes it easier to connect the extension piece to further connection parts.

Expediently, the connection sections of the extension piece can be formed complementary (partially complementary or fully complementary) to one another. In other words, the connection sections of the extension piece could be plugged together. The extension piece can thus be easily inserted between the further connection parts of the connection assembly. It is also conceivable for a plurality of extension pieces to be plugged together in order to lengthen the connection assembly.

Advantageously, the clamping device can have a manually operable clamping lever and be configured in such a way that, for clamping the extension piece to one of the connection parts via the clamping element and counter element, only this clamping lever has to be operated. This makes clamping possible in a simple manner and with few components.

In a preferred embodiment, the clamping element can be rotatably mounted on the clamping device and biased so that the clamping element automatically engages a counter element of the connection part when the extension piece is plugged together with a connection part of the connection assembly. Therefore, the clamping element and the counter element can automatically engage with each other, in particular behind each other, when the extension piece and connection part are plugged together. The extension piece and the connection part are thus secured to one another, even if they are not yet clamped by means of the clamping device. This increases safety during handling, since the risk of damage and the risk of injury are reduced. A spring element, which acts on the clamping element for example, can be provided for biasing. The spring element can be a compression spring.

Specifically, the clamping element and/or the counter element can each be fixed to the extension piece via a transverse bolt, wherein the transverse bolt projects transversely or obliquely to the longitudinal axis through the cross section of the extension piece and engages with its ends in a recess formed in the wall of the extension piece or in a passage formed in the wall of the extension piece respectively. The clamping element and counter element are thus connected to the extension piece in a stable manner. The transverse bolt allows force to be transmitted reliably, even with comparatively soft materials for the extension piece. For example, the extension piece can be made of aluminum. The transverse bolt can be designed as a (tubular) sleeve. The transverse bolt can be oriented radially in the extension piece.

In a preferred embodiment, the clamping device can have a bearing part which wraps around the transverse bolt of the extension piece and defines a bearing point spaced apart from the transverse bolt and having a bearing axis oriented obliquely or orthogonally to the central longitudinal axis of the transverse bolt. This means that a bearing axis is provided in a space-saving manner and in a manner which is favorable in terms of the force path. The bearing part can be designed as a bearing plate. For reasons of stability, the bearing plate can preferably have a U-shaped cross section.

Advantageously, the clamping lever can be pivotably mounted on the bearing point of the bearing part via a lever shaft, wherein the clamping element is coupled to the lever shaft by means of an eccentric. This makes it possible to apply high forces to the clamping element and the counter element, which may be in engagement with the clamping element, in a structurally simple and cost-effective manner.

Optionally, at the connection section of the extension piece a manually operable pushbutton can be provided, which pushbutton acts on the clamping element, wherein by operating the pushbutton the clamping element can be brought out of engagement with the counter element of a connection part of the connection assembly (when the clamping device is released). This reduces the risk of injury and damage. Therefore, the pushbutton has to be pressed in order to bring the clamping element and the counter element out of engagement. If the clamping lever is (accidentally) actuated (the clamping device is detached), the extension piece can be prevented from detaching unintentionally, since the pushbutton has to be operated in order for this to occur.

Alternatively or additionally, the clamping device can be configured in such a way that, after the clamping element has been released, the clamping lever can be moved further in the opening direction in order to bring the clamping element out of engagement with the counter element of a connection part of the connection assembly. In this way too, the connection parts can be prevented from detaching from one another unintentionally. Such a configuration requires comparatively few components and operating elements.

Advantageously, the counter element can be displaceably guided on the extension piece and can be mounted on the extension piece or on the second connection section of the extension piece by interposition of a spring. This provides for structural tolerance compensation (the spring compensates for tolerances). Readjustment due to wear is no longer required. The direction of force of the spring is oriented along or in parallel with the longitudinal direction of the extension piece. The spring can be positioned, for example, between a protrusion of the counter element and the transverse bolt. The spring can be, for example, a compression spring.

Expediently, the counter element can be coupled to or merge with a retaining portion, wherein the retaining portion comprises an angled portion, and wherein the spring can be arranged between the angled portion and the transverse bolt at the second connection section of the extension piece. This results in a structurally simple and stable coupling of the spring, counter element and transverse bolt with few components. This results in an overall favorable configuration of the tolerance compensation.

In a preferred embodiment, in the connection sections an electrical plug connector and/or a connection opening to a flow channel formed in the extension piece can be arranged respectively, wherein the plug connector and/or the connection opening are arranged inside the cross section of the respective connection section. In this way, simple coupling of the interfaces is made possible, since the extension piece only has to be plugged together with one or two connection parts. This makes handling easier and contributes to a space-saving design. The arrangement within the cross section reduces contamination and wear. The connection openings on both sides of the extension piece are flow-connected through the flow channel. The electrical plug-in connectors on both sides, in particular formed to be complementary to one another, are electrically connected by means of one or more electrical lines. The electrical lines extend in particular inside the extension piece, for example in a section of the extension piece that is separate from the flow channel.

Advantageously, at least one of the plug connectors can be mounted on the connection section or on the extension piece, respectively, via a resilient element, in particular in such a way that the plug connector is movable relative to the connection section or to the extension piece. The plug connectors thus have play so that the pipe parts can always be plugged together. It is conceivable for the plug connector to be returnable by the elastic element into a, preferably central, initial position.

The measures described in connection with the connection assembly can be used to further develop the connection sections of the extension piece.

BRIEF DESCRIPTION OF THE DRAWINGS

The invention is explained in more detail below with reference to the drawings, the same or functionally similar elements being provided with identical reference signs, but in some cases only once. In the drawings.

DETAILED DESCRIPTION

Figure 1:
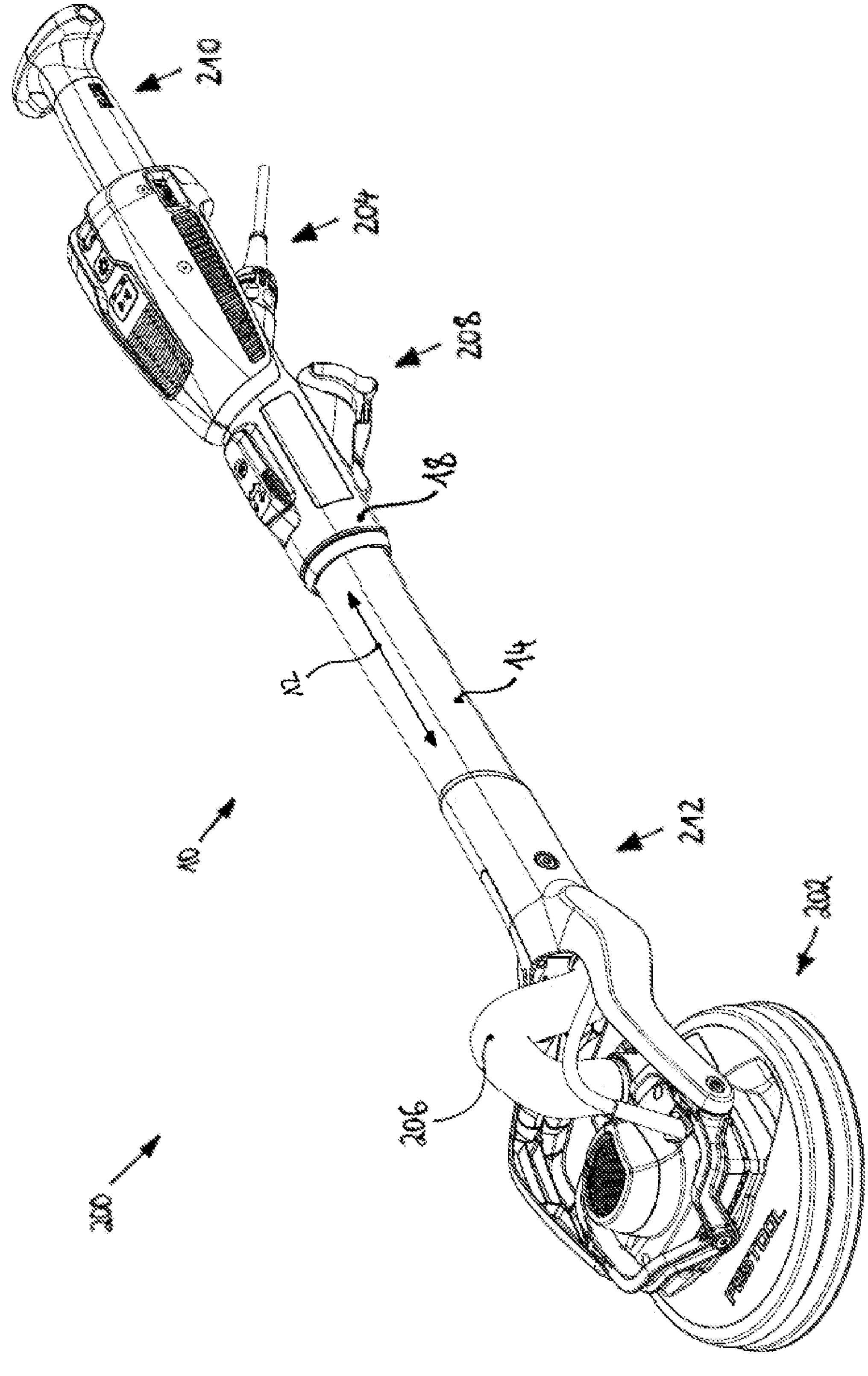
FIG. 1 is a perspective view of an embodiment of a hand-guided machine tool and a connection assembly comprising two connection parts.

FIG. 1 shows a hand-guided machine tool, which is designated as a whole by reference sign 200 (hereinafter "machine tool"). By way of example, the machine tool 200 is designed as a surface finishing machine 200 in the form of a long-neck sander.

The machine tool 200 has a tool head 202 in the form of a grinding head 202. In addition, the machine tool 200 has a further machine module 204 in the form of a handle part 204. The machine tool 200 also has a connection assembly 10 for connecting the grinding head 202 and the handle part 204.

A hose section 206 is arranged on the grinding head 202, one end of which section is flow-connected to a suction point (not shown) located on the grinding head 202. The other end of the hose section 206 is flow-connected to a hose outlet 208 arranged on the handle part 204, specifically by means of the connection assembly 10. A hose (for example a suction hose) can be connected to the hose outlet 208, the other end of which hose can be connected to a vacuum cleaner (not shown), for example. In this way, grinding dust that forms on the grinding head 202 can be sucked up at the suction point and discharged via the hose section 206, the connection assembly 10 (flow channel or suction channel) and the hose outlet 208.

There are also current-carrying lines (provision of electrical power; without reference signs) and control lines (provision of control signals; without reference signs) on the grinding head 202. The lines and control lines are electrically or electronically connected at one end to components arranged on the grinding head 202. At the other end, these components are electrically or electronically connected to control and supply devices (without reference signs) arranged on the handle part 204, specifically via the connection assembly 10 (electrical plug connection). The handle part 204 can have a handle section 210 at which the handle part 204 can be gripped or grasped by a user's hand.

The connection assembly 10 can have a connection part 14 and a further connection part 18, which can be connected to and detached from one another (see FIG. 1). In other words, the connection parts 14, 18 are detachably connectable to one another. The connection part 18 is formed on the handle part 204 and has a connection section which corresponds to the connection section 22 described below (see FIG. 3*f*.). The handle part 204 and its connection section can be made of plastics material, for example.

The connection part 14 has at one end a connection section 20 described below (cf. FIG. 3*f*.) which can be plugged together with the connection section (without a reference sign) formed on the handle part 204. At the other end, the connection part 14 is connected to a connection piece 212 which carries the grinding head 202.

Figure 2:
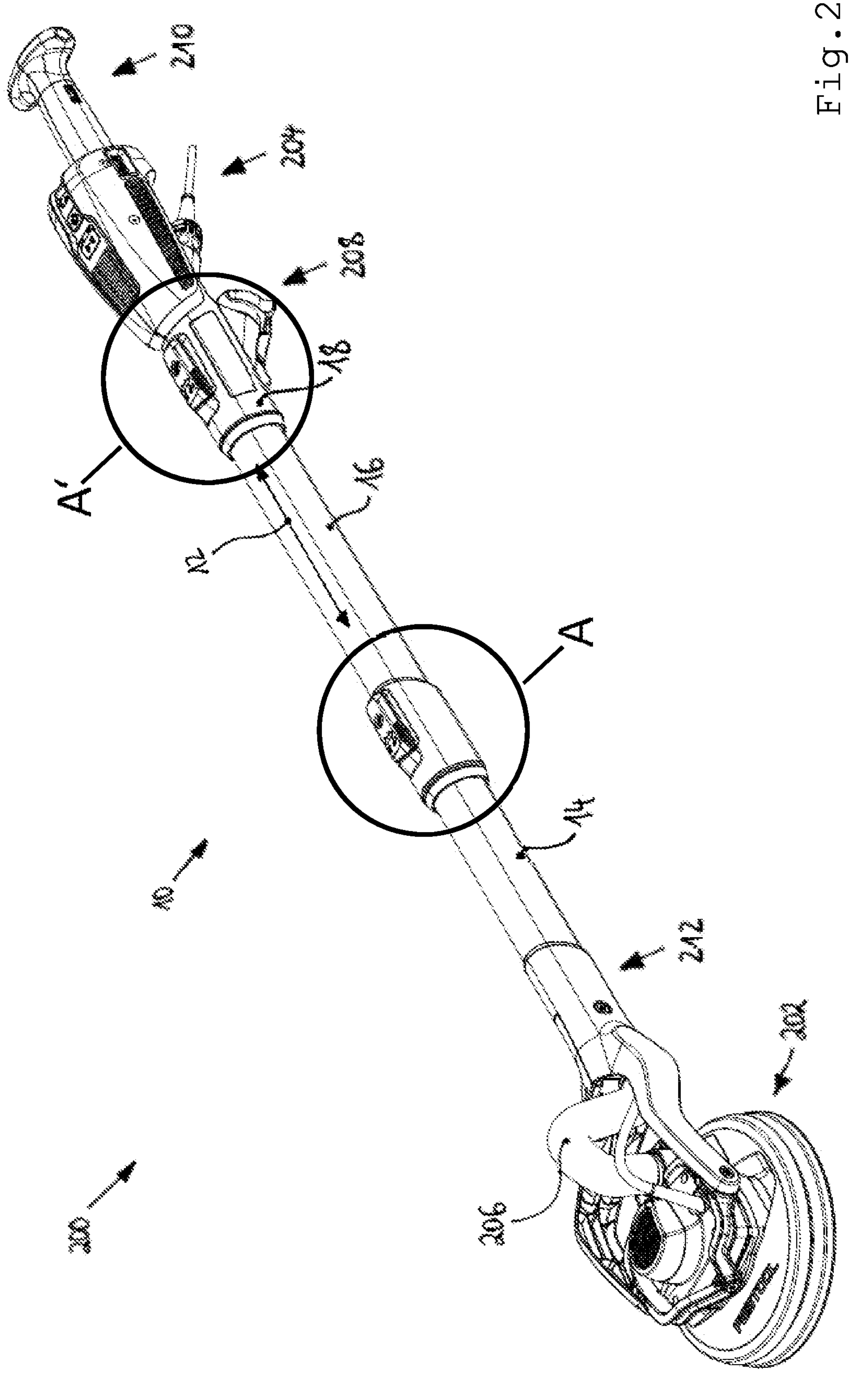
FIG. 2 shows the machine tool from FIG. 1, with an extension piece being used as a further connection part in the connection assembly.

Optionally, the connection assembly 10 can have at least one further connection part 16, which can be inserted between the two other connection parts 14, 18 as an extension piece 16 (see FIG. 2). For this purpose, the extension piece 16 has a connection section 20 at one end and a connection section 22 at the other end, as is described further below.

The connection assembly 10 is described in more detail below, specifically with reference to the connection section 20 of the connection part 14 and the connection section 22 of the connection part 16 (cf. marking "A" in FIG. 2 and FIG. 3*f*.). A corresponding connection assembly 10 is located between the connection part 14 and the connection part 18 and between the connection part 16 and the connection part 18 (cf. marking "A," only indicated in FIG. 2).

The connection assembly 10 as a whole forms a connection line, for example a connection pipe. The connection parts 14, 16 each have a pipe section, for example a section of an aluminum pipe, on which a connection section 20, 22 is formed respectively.

As already indicated, the connection assembly 10 is used to connect the grinding head 202 and the handle part 204 of the hand-guided machine tool 200 in the form of a long-neck sander. For this purpose, the connection assembly 10 has (at least) two connection parts 14, 16 following one another along a longitudinal axis 12 (cf. FIG. 3*f*.). The connection parts 14, 16 are detachably connectable to one another.

Figure 5:
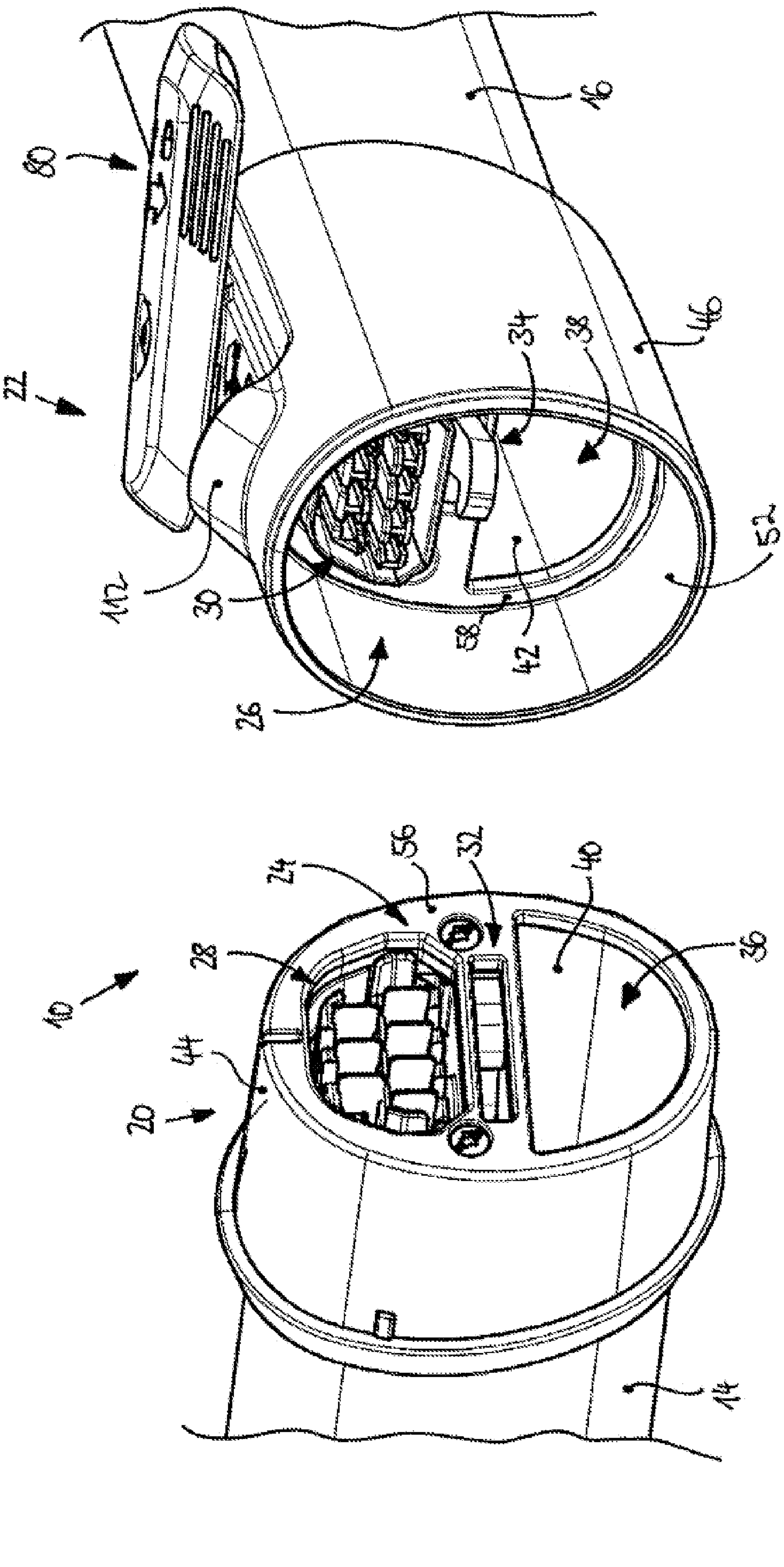
FIG. 5 shows the connection sections from FIG. 3 with a view into the interior of the connection sections and the respective connection parts.

The connection part 14 has a connection section 20. The connection part 16 has a connection section 22. The connection parts 14, 16 are connectable to one another via the connection sections 20, 22, specifically by plugging the connection sections 20, 22 together. The connection sections 20, 22 each delimit an inner cross section 24, 26 toward the outside (see inter alia FIGS. 5 and 6).

At the connection sections 20, 22, the connection parts 14, 16 each have three different interfaces which are each arranged in the inner cross section 24, 26 or inner chamber 24, 26 of the relevant connection section 20, 22. The interfaces are an electrical plug connection, a mechanical clamping connection and a flow connection. The clamping connection is spatially arranged between the plug connection and the flow connection and is located approximately in the center of the connection sections.

The connection part 14 has in the inner cross section 24 an electrical plug connector 28 which forms a component of the electrical plug connection. The plug connector 28 can be designed as a socket (female part), for example. In addition, the connection part 14 has a counter element 32 which forms a component of the mechanical clamping connection. The counter element 32 can be designed as a hook-shaped element or hook 32, for example. The connection part 14 also has a connection opening 36 to a flow channel 40 formed in the connection part 14 (suction channel), part of the flow connection being formed thereby.

The connection part 16 has in the inner cross section 26 an electrical plug connector 30 which forms a component of the electrical plug connection. The plug connector 30 can be designed as a plug (male part), for example. In addition, the connection part 16 has a clamping element 34 which forms a component of the mechanical clamping connection. The clamping element 34 can be designed as a claw-shaped element or clamping claw 34, for example. The clamping element 34 can be actuated by means of an actuating device in the form of a clamping lever 80. The connection part 16 also has a connection opening 38 to a flow channel 42 formed in the connection part 14, part of the flow connection being formed thereby.

The connection part 14 is described in more detail below. As already indicated, the connection part 14 has a pipe section, the connection section 20 being arranged at one of the ends thereof. The connection section 20 has a sheathing 44 which encloses the connection part 14 (at its free end) sectionally (see FIGS. 5 and 6). On the end face, the sheathing 44 has three passages (without reference signs) for the electrical plug connector 28, the counter element 32 and the connection opening 36.

The sheathing 44 has an outer surface 54 which tapers outwardly, i.e. toward the free end, in particular conically. In addition, the sheathing 44 has a resting section 56 covering the end face of the connection part 14 (end-face end of the pipe section). When the connection parts 14, 16 are plugged together, the resting section 56 can come into contact with a resting section 58 of the connection part 16. At its end facing away from the free end of the connection part 14, the sheathing 44 has a radially projecting protrusion 60. The protrusion 60 can limit the plugging together of the connection parts 20, 22 in the direction of insertion. Irrespective of this, the protrusion 60 creates a smooth transition of the contour from the sheathing 44 to the pipe section of the connection part 14.

In the pipe section of the connection part 14, a wall 66 extending parallel to or along the longitudinal axis 12 is provided, which wall divides the (inner) cross section of the connection part 14 into two separate sections 70, 72. The flow channel 40 is arranged in the first section 70. The counter element 32 and the electrical plug connector 28 are arranged in the further section 72.

Figure 13:
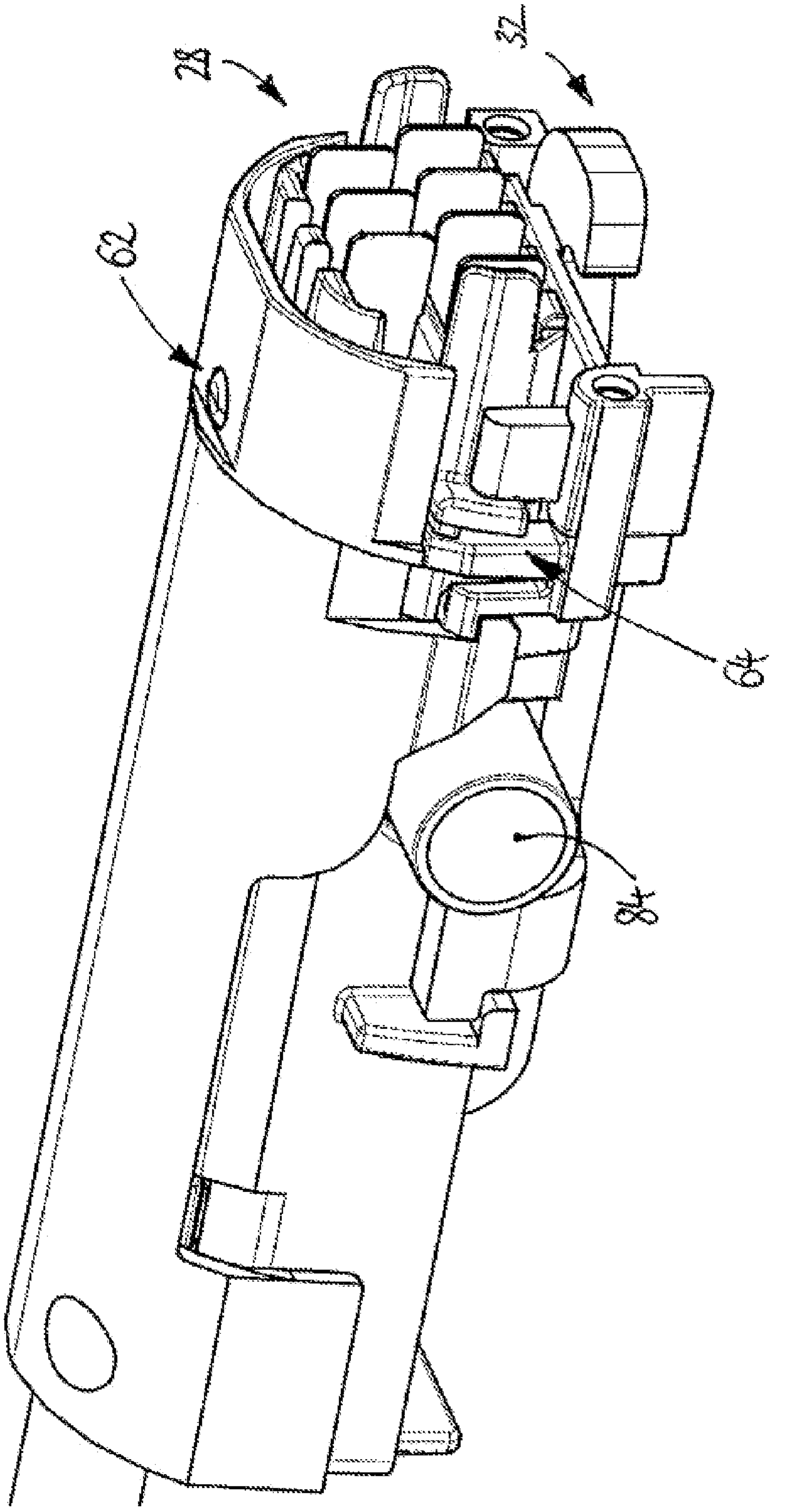
FIG. 13 shows the counter element and the plug connector of the connection assembly according to FIG. 3 in isolation.
Figure 14:
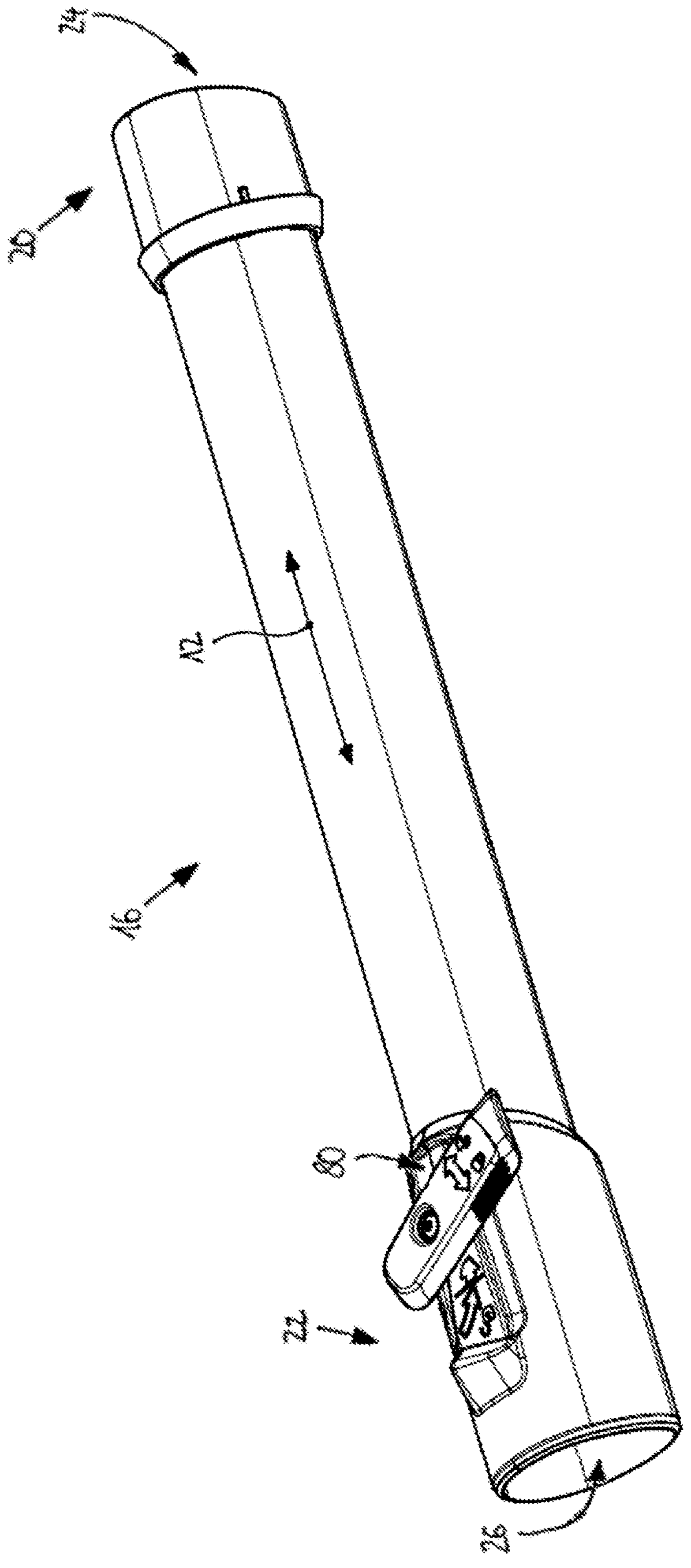
FIG. 14 is a perspective view of the extension piece of the connection assembly from FIG. 2 in isolation.
Figure 15:
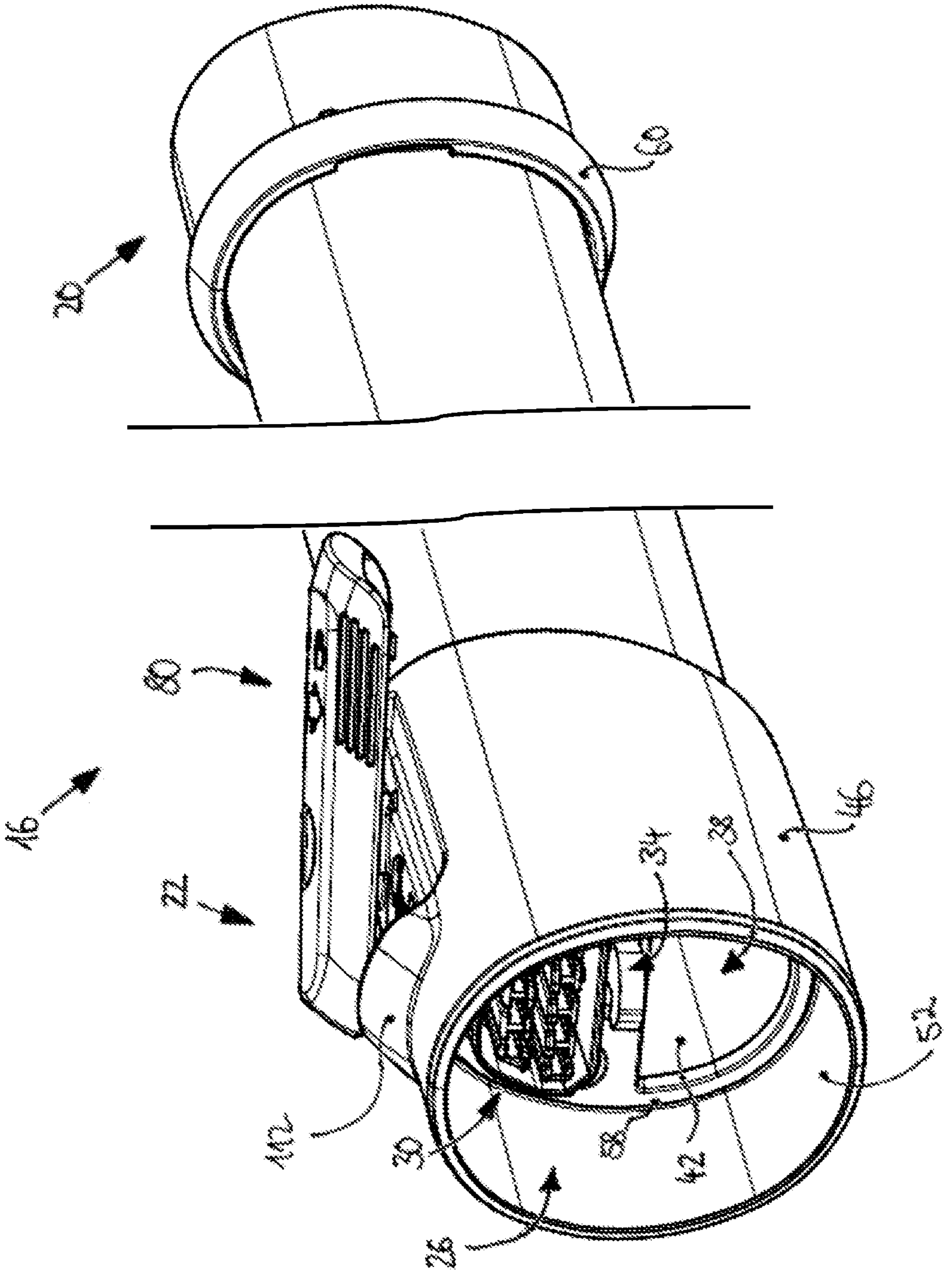
FIG. 15 shows the extension piece according to FIG. 14. with a view of one of the connection sections.
Figure 16:
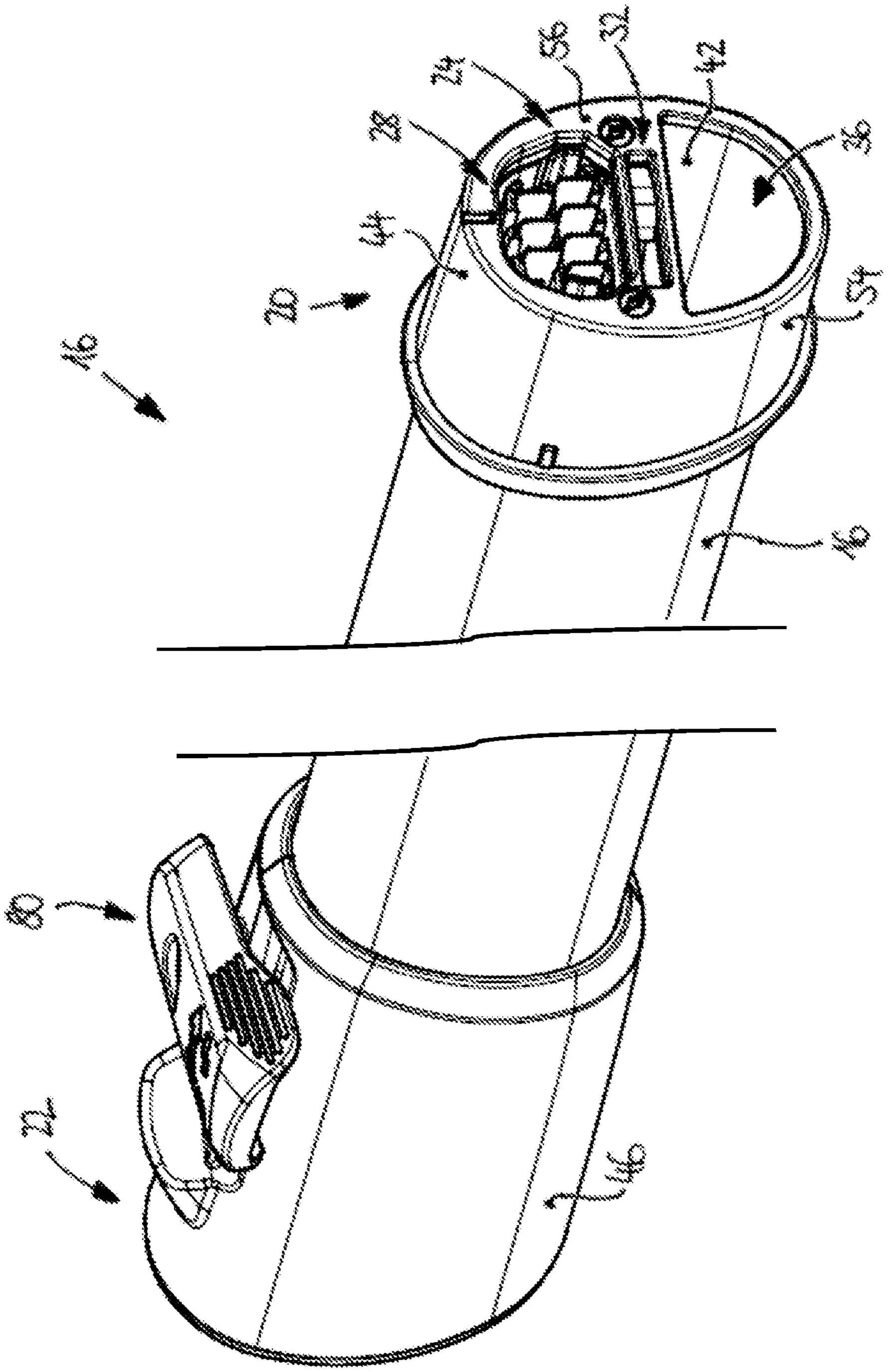
FIG. 16 shows the extension piece according to FIG. 14 with a view of the other connection section.
Figure 17:
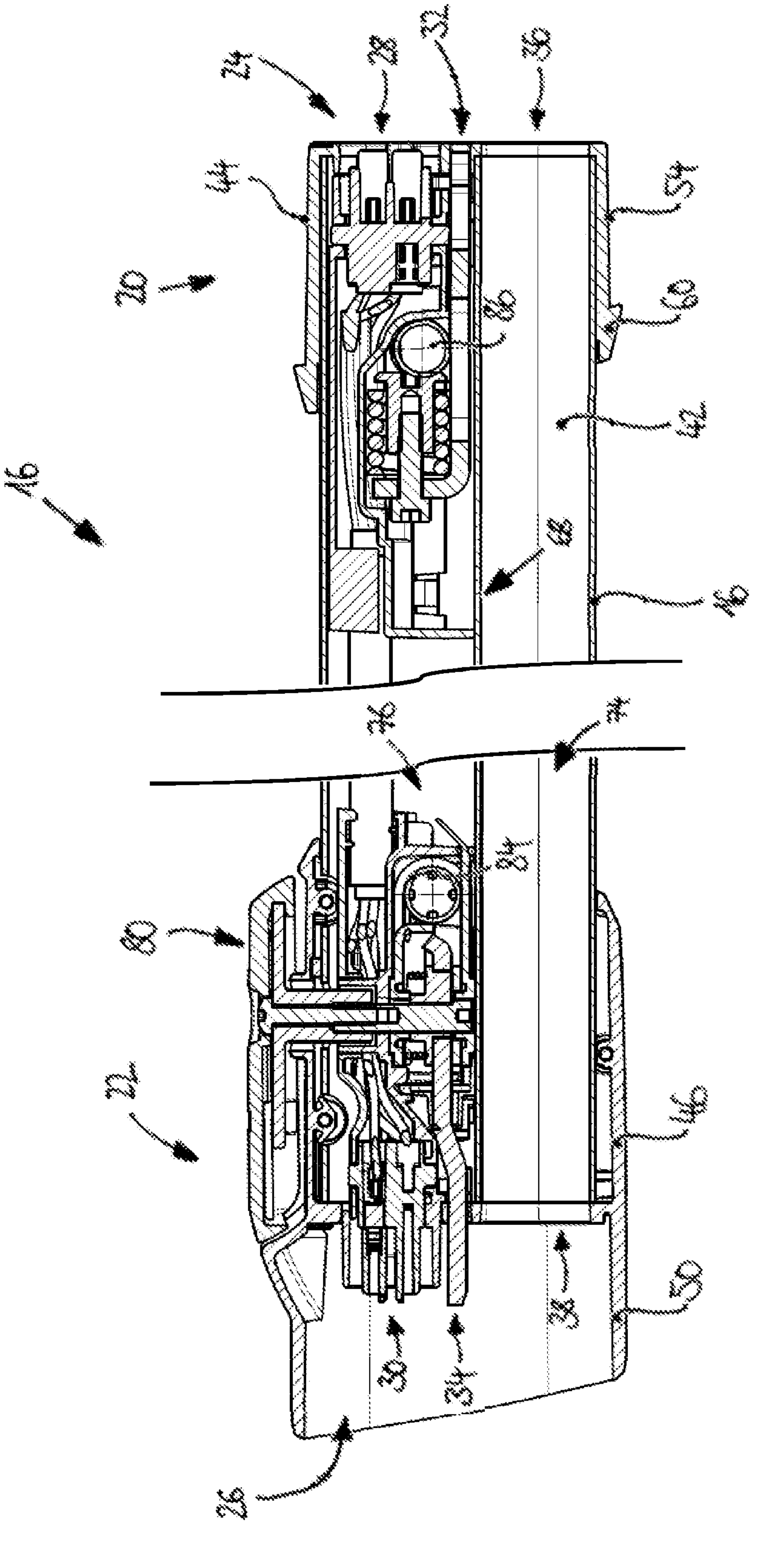
FIG. 17 is a half section through the extension piece according to FIG. 14.

The plug connector 28 is mounted on the connection part 14 via an elastic element 64 (see FIG. 13). Due to the elastic element 64, the plug connector 28 is movable relative to the connection section 20 or to the connection part 14. The plug connector 28 is returnable by the elastic element 64 into a, preferably central, initial position. If the plug connector 28 has rotated off-center, it can be returned by means of the elastic element 64. Dust removal openings can optionally be formed on the plug connector 28 (not shown). These openings reduce dust deposits on the plug connector 28. The dust removal openings can be flow-connected to the flow channel 40.

The counter element 32 is fixed to the connection part 14 by means of a transverse bolt 84 (cf. inter alia FIGS. 6 to 10 and 13). The transverse bolt 84 projects transversely to the longitudinal axis 12 through the cross section 24 of the connection part 14. With each of its ends, the cross section 84 engages in a passage 88 formed in the wall of the connection part 14 (wall of the pipe section) (see FIG. 8).

The counter element 32 is displaceably guided on the connection part 14 and is displaceably mounted on the connection part 14 by interposition of a spring 106. The (hook-shaped) counter element 32 transitions into a retaining portion 108, the retaining portion 108 comprising an angled portion 110 (see inter alia FIGS. 7 and 8). The spring 106 is arranged between the angled portion 110 and the transverse bolt 84 (see FIG. 8). The spring 106 is fastened to the angled portion 110 by means of a screw 11, a guide bush 113 which guides the spring 106 being screwed onto the screw. The spring 106 is designed in particular as a compression spring 106.

The connection part 16 is described in more detail below. As already indicated, the connection part 16 has a pipe section, the connection section 22 being arranged at one of the ends thereof. The connection section 22 has a sheathing 46 which encloses the connection part 16 (at its free end shown here) sectionally (see FIG. **4*f*). On the end face, the sheathing 46 has a plurality of passages (without reference signs) for the electrical plug connector 30, the clamping element 34 and the connection opening 38**.

The sheathing 46 has a collar 50 projecting parallel to the longitudinal axis 12 (see FIG. 6), by which the connection section 22 encompasses the opposite connection section 20 when the connection parts 14, 16 are plugged together. The collar 50 has an outwardly widening, in particular conically widening, inner surface 52. The inner surface 52 is designed in particular to correspond to the conically tapering outer surface 44 of the connection section 20.

The connection section 22 has on the sheathing 46 a resting section 58 covering the end face of the connection part 16 (end-face end of the pipe section). The resting section 58 can come into contact with the resting section 56 of the connection section 20 when the connection parts 14, 16 are plugged together.

A projection 112, which can be designed as a lug, is provided on the connection section 22 on the sheathing 46. The projection 112 is designed in such a way that it adjoins a free end of the clamping lever 80 when said clamping lever 80 is in the position in which the clamping element 34 is braced. The projection 112 is thereby a continuation of the contour of the clamping lever 80 (see in particular FIG. 6).

Figure 7:
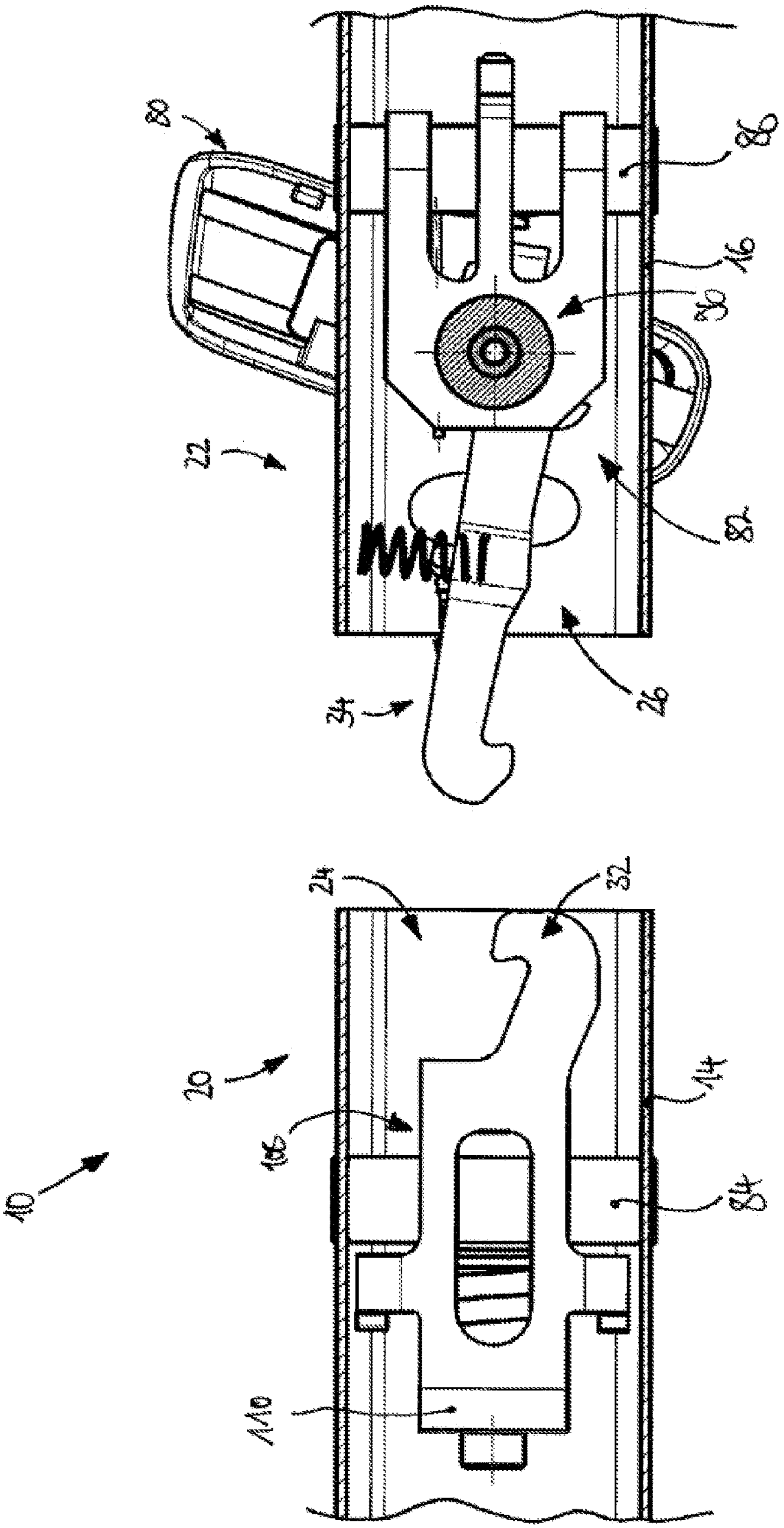
FIG. 7 is a longitudinal section through the connection sections and connection parts from FIG. 3, the sectional plane being arranged parallel to the wall which divides the cross section of the connection parts into two separate sections.
Figure 8:
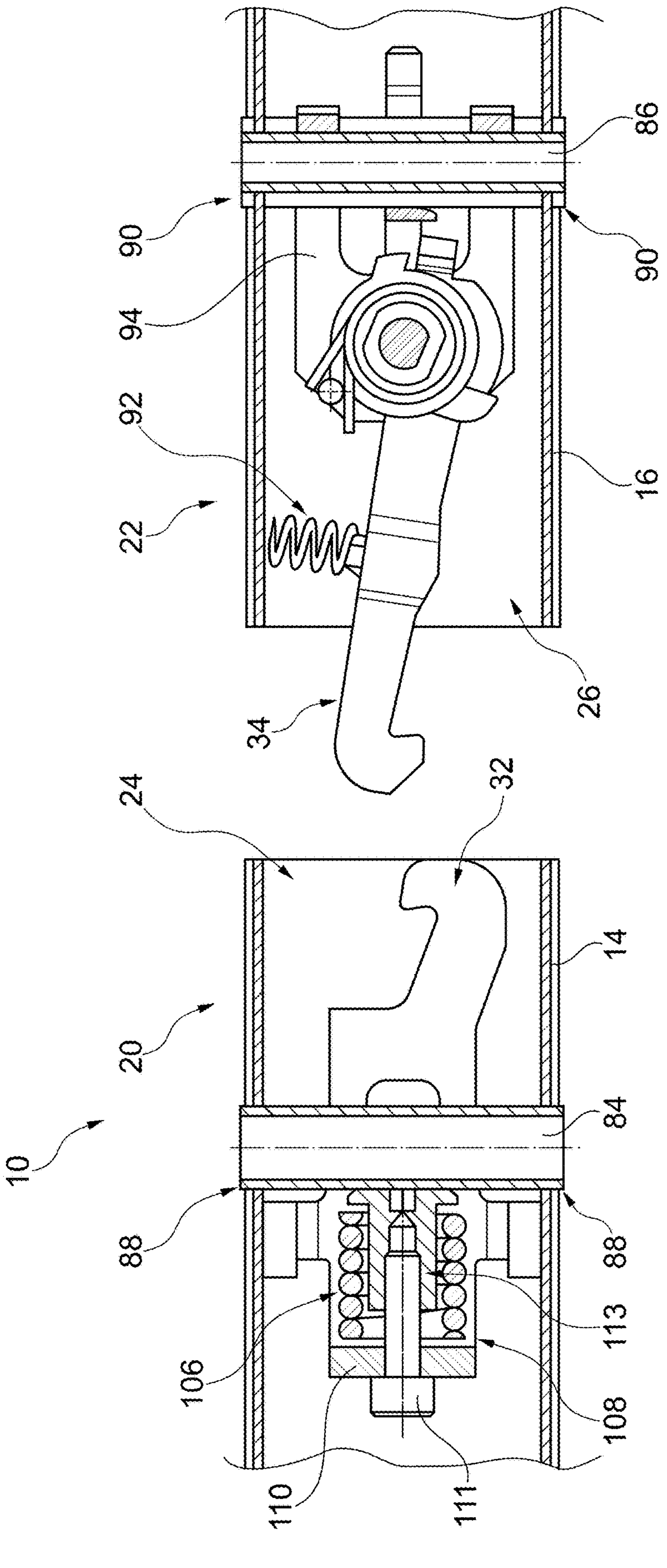
FIG. 8 is a sectional view similar to FIG. 7, with the sectional plane being arranged in such a way that it intersects the transverse bolts.

An actuatable clamping device 82 is provided on the connection section 22 of the connection part 16 and acts on the clamping element 34 (see in particular FIG. 7). The clamping element 34 and the counter element 32 are designed in such a way that they can be brought into engagement with one another when the connection sections 20, 22 are plugged together. By actuating the clamping device 82, the connection parts 14, 16 are braceable against one another when the clamping element 34 engages with the counter element 32.

The clamping device 82 is actuatable by means of the manually operable clamping lever 80. In addition, the clamping device 82 is designed in such a way that only the clamping lever 80 has to be operated for clamping the connection parts 14, 16 by means of the clamping element 34 and counter element 32.

The clamping element 34 is rotatably mounted on the clamping device 82 and is biased relative to the counter element 32. As a result, the clamping element 34 and the counter element 32 come into engagement with one another when the connection sections 20, 22 are plugged together. For this purpose, a spring 92 is provided, which acts on the clamping element 34 and is supported, for example, on the inner wall of the pipe section of the connection part 16 (see in particular FIG. 8). The spring 92 is in particular a compression spring 92.

The clamping element 34 is fixed to the connection part 16 by means of a transverse bolt 86. The transverse bolt 86 extends transversely to the longitudinal axis 12 through the cross section 26 of the connection part 16. With each of its ends, the transverse bolt 86 engages in a passage 90 formed in the wall of the connection part 16 (see FIG. 8).

The clamping device 82 has a bearing part 94, which is designed as a bearing plate with a U-shaped cross section (see inter alia FIGS. 7 to 10). The bearing part 94 wraps around the transverse bolt 86 and defines a bearing point 96 spaced apart from the transverse bolt 86 and having a bearing axis 98 oriented orthogonally to the central longitudinal axis of the transverse bolt 86 (see in particular FIG. 10). The clamping lever 80 is pivotably mounted on the bearing point 96 of the bearing part 94 by means of a lever shaft 100, the clamping element 34 being coupled to the lever shaft 100 by means of an eccentric 102 (see in particular FIGS. 8 to 10).

The clamping device 82 can be designed in such a way that the clamping lever 80 can be moved further in the opening direction after the clamping element 34 has been released (for example counterclockwise in FIG. 4) in order to bring the clamping element 34 and the counter element 32 out of engagement, the connection parts 14, 16 thus being detachable from one another.

Figure 9:
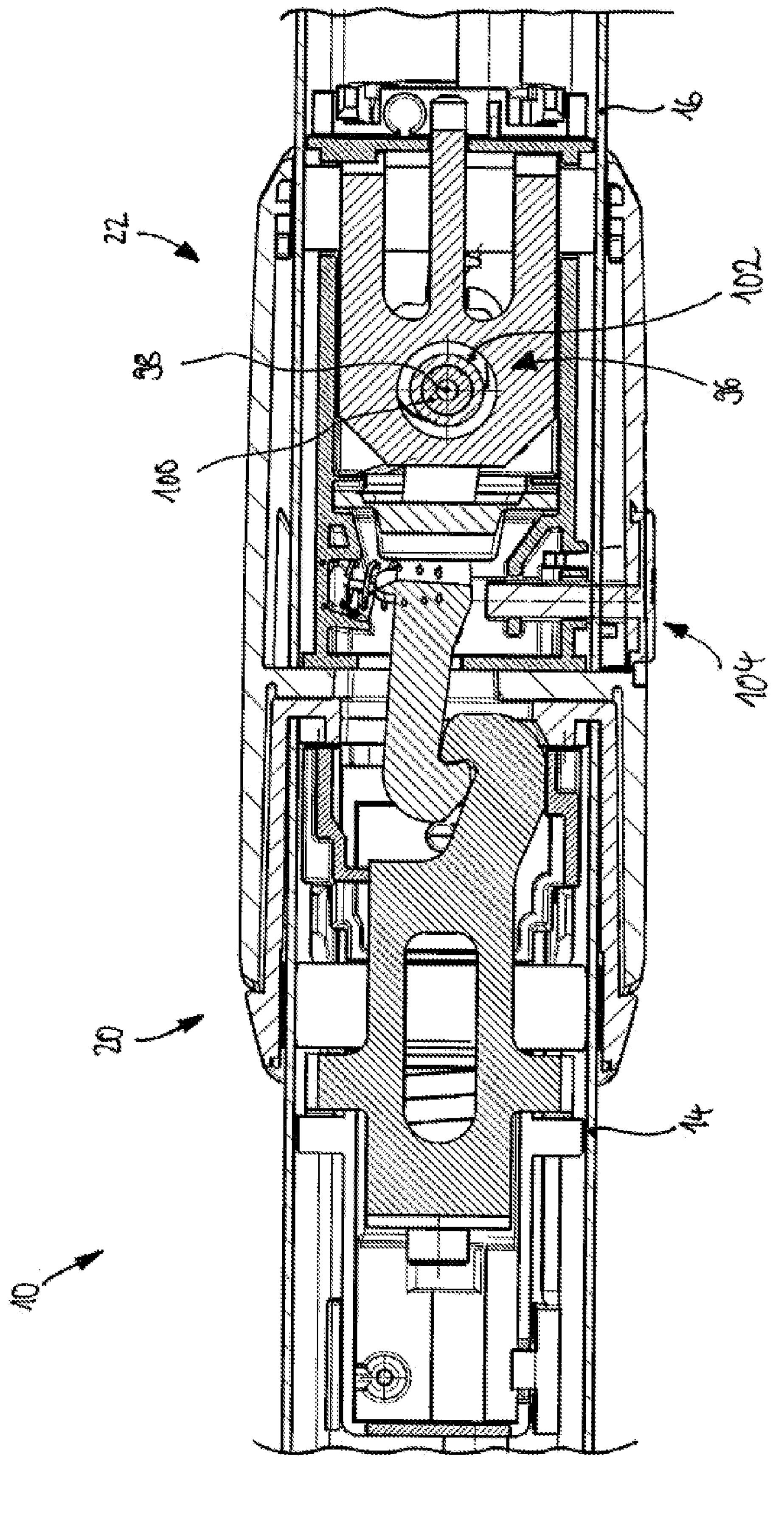
FIG. 9 is a longitudinal section through the plugged together connection sections according to FIG. 3, with the sectional plane intersecting the clamping element and the counter element.
Figure 10:
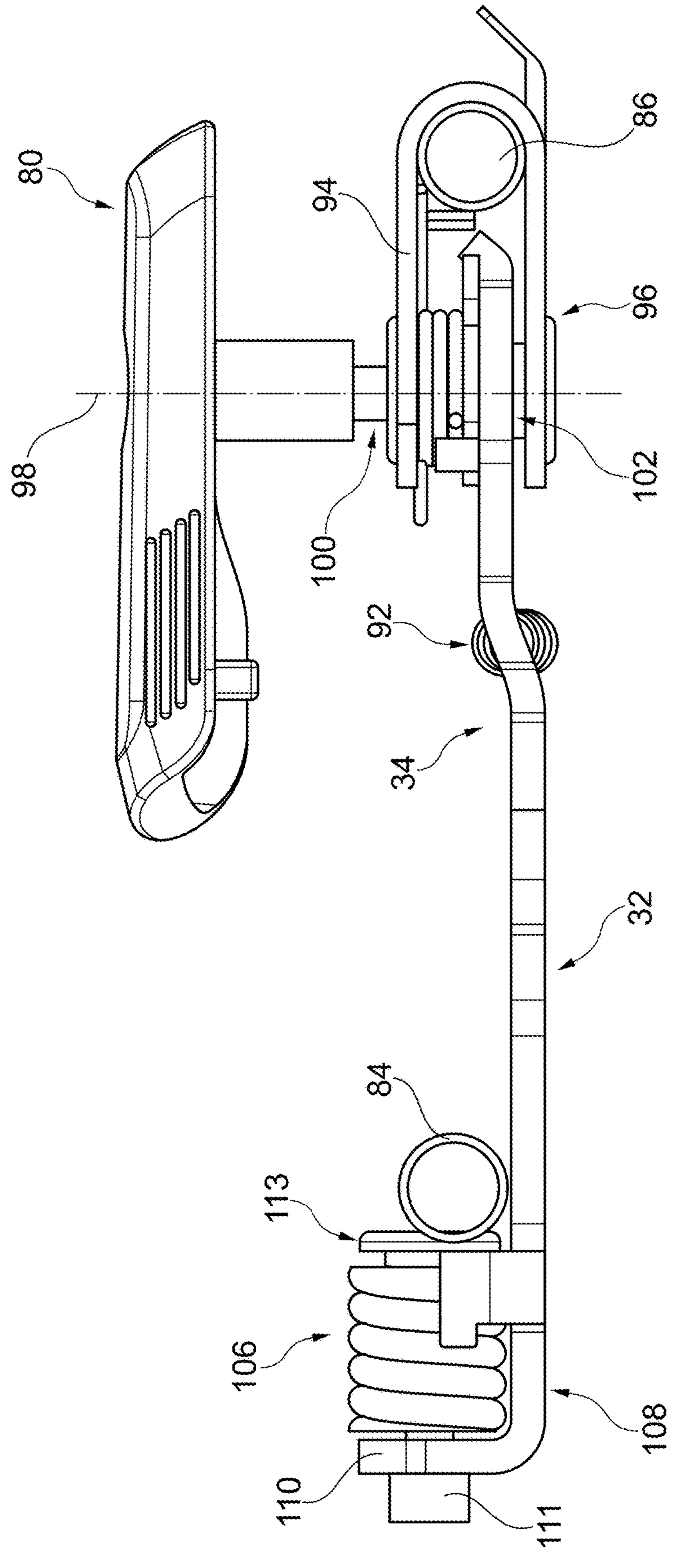
FIG. 10 shows the clamping device, clamping element and counter element of the connection assembly according to FIG. 3 in isolation.
Figure 11:
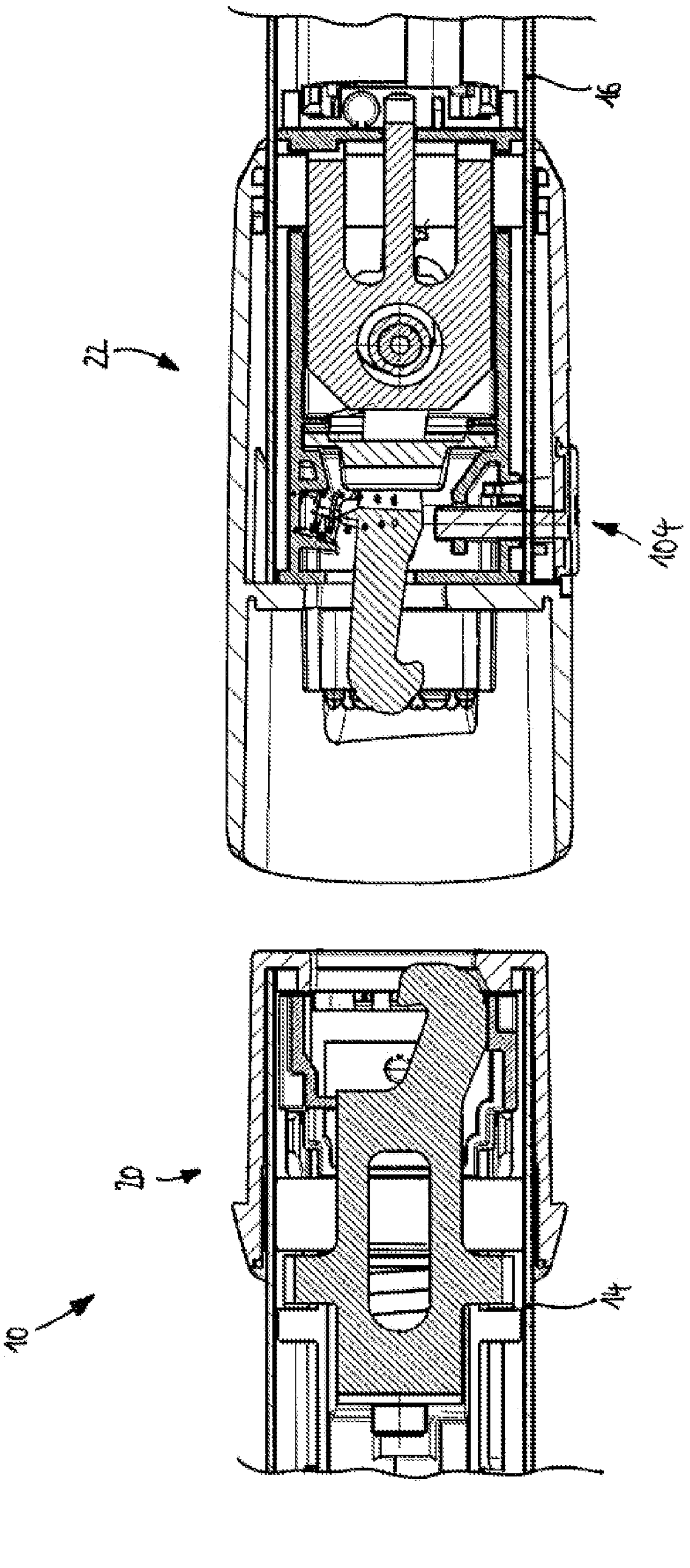
FIG. 11 is a longitudinal section through the connection sections according to FIG. 3 when not plugged together, with the sectional plane intersecting the clamping element and the counter element.
Figure 12:
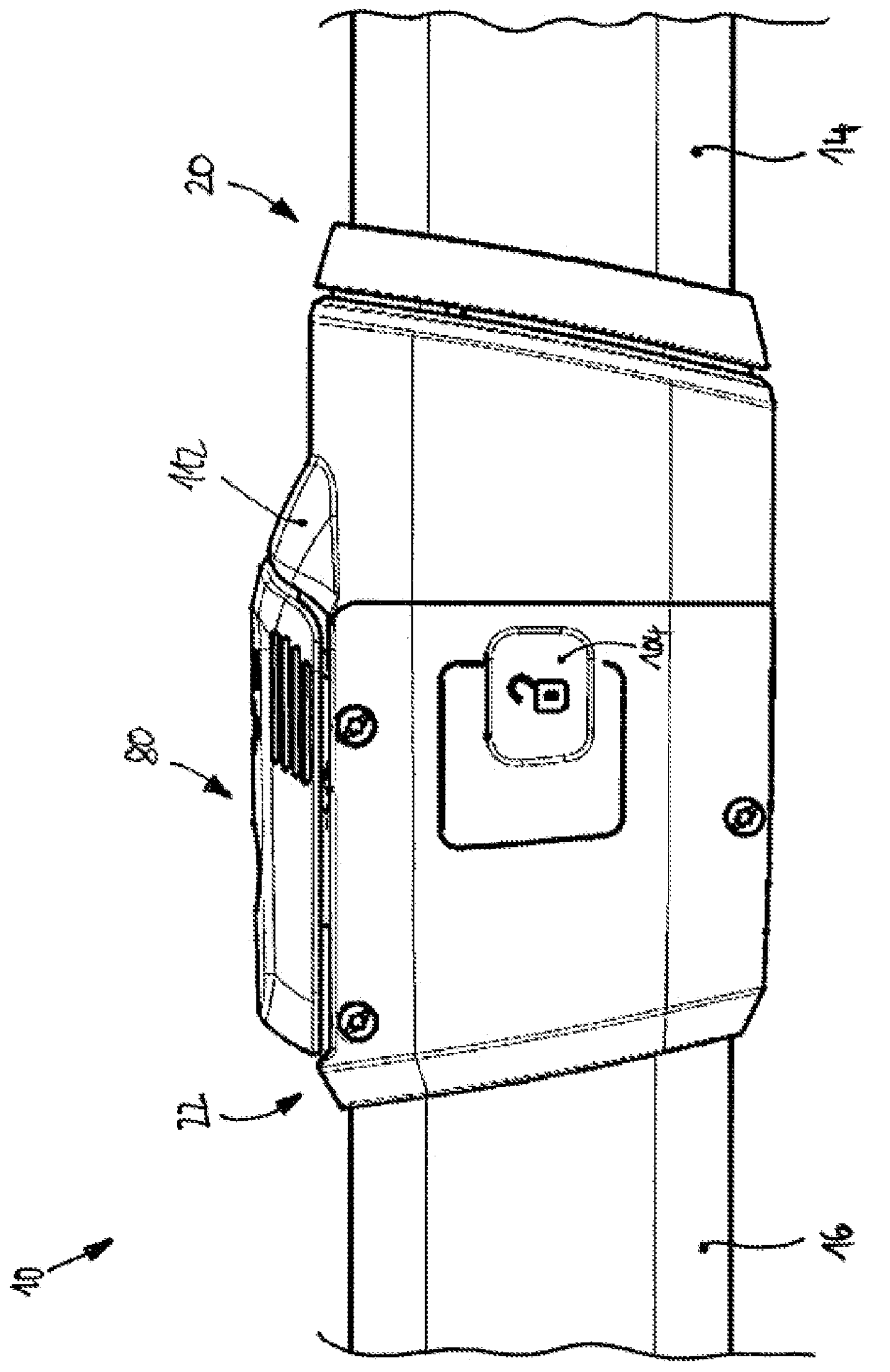
FIG. 12 is a side view of the plugged together connection sections according to FIG. 3.

Optionally, a pushbutton 104 that can be operated manually (for example using a finger) can be provided on the connection section 22 of the connection part 16, which pushbutton acts on the clamping element 34, it being possible to bring the clamping element 34 and the counter element 32 (when the clamping device 82 is released) out of engagement by operating the pushbutton 104 (see FIGS. 9, 11 and 12).

In the pipe section of the connection part 16, a wall 68 extending parallel to or along the longitudinal axis 12 is provided, which wall divides the (inner) cross section of the connection part 16 into two separate sections 74, 76. The flow channel 42 is arranged in the first section 74. The clamping element 34 and the clamping device 82 and the electrical plug connector 30 are arranged in the further section 76 (cf. FIG. 6).

The plug connector 30 of the connection part 16 can optionally be mounted via an elastic element on the connection part 16. The plug connector 30 is thus movable relative to the connection part 16 (not shown). The plug connector 30 can be returned by the elastic element into a, preferably central, initial position. If the plug connector 30 were to rotate off-center, it can be returned into the initial position by means of the elastic element.

Optionally, one or more dust removal openings can be formed in the plug connector 30, in particular adjacent to its plug contacts. The dust removal openings can optionally be flow-connected to the flow channel 42 formed in the connection part 16.

FIGS. 14 to 17 show the connection part 16 in the form of an extension piece in isolation. The extension piece 16 extends in a longitudinal direction 12. The extension piece 16 has a pipe section which has the connection section 22 at one end (on the left in FIG. 14) and the connection section 20 at the other end (on the right in FIG. 14).

The connection section 22 of the extension piece 16 is designed corresponding to the connection section 22 of the connection part 16 described above (the same or functionally similar elements are provided with identical reference signs). To avoid repetition, reference is therefore made to the above statements regarding the connection section 22 of the connection part 16.

The connection section 20 of the extension piece 16 is designed corresponding to the connection section 20 of the connection part 14 described above (the same or functionally similar elements are provided with identical reference signs). To avoid repetition, reference is therefore made to the above statements regarding the connection section 20 of the connection part 14.

Notwithstanding the above, the following should be noted: In the pipe section of the extension piece 16, a wall 68 extending parallel to or along the longitudinal axis 12 is provided, which wall divides the cross section of the extension piece 16 into two separate sections 74, 76.

The flow channel 42 is arranged in the first section 74. The flow channel 74 extends between the connection section 22 and the connection section 20 of the extension piece 16. The connection openings 36 and 38 both open into the flow channel 42.

In the further section 76, the electrical plug connector 28 and the counter element 32 are arranged on the connection section 20 and the clamping element 34 and the clamping device 82 and the electrical plug connector 30 are arranged on the connection section 22. The electrical plug connector 28 and the electrical plug connector 30 are electrically or electronically connected to one another by means of electrical or electronic lines extending through the further section 76. Therefore, current and/or control signals can be transmitted through the extension piece 16 by means of the electrical plug connectors 28, 30.

Figure 4:
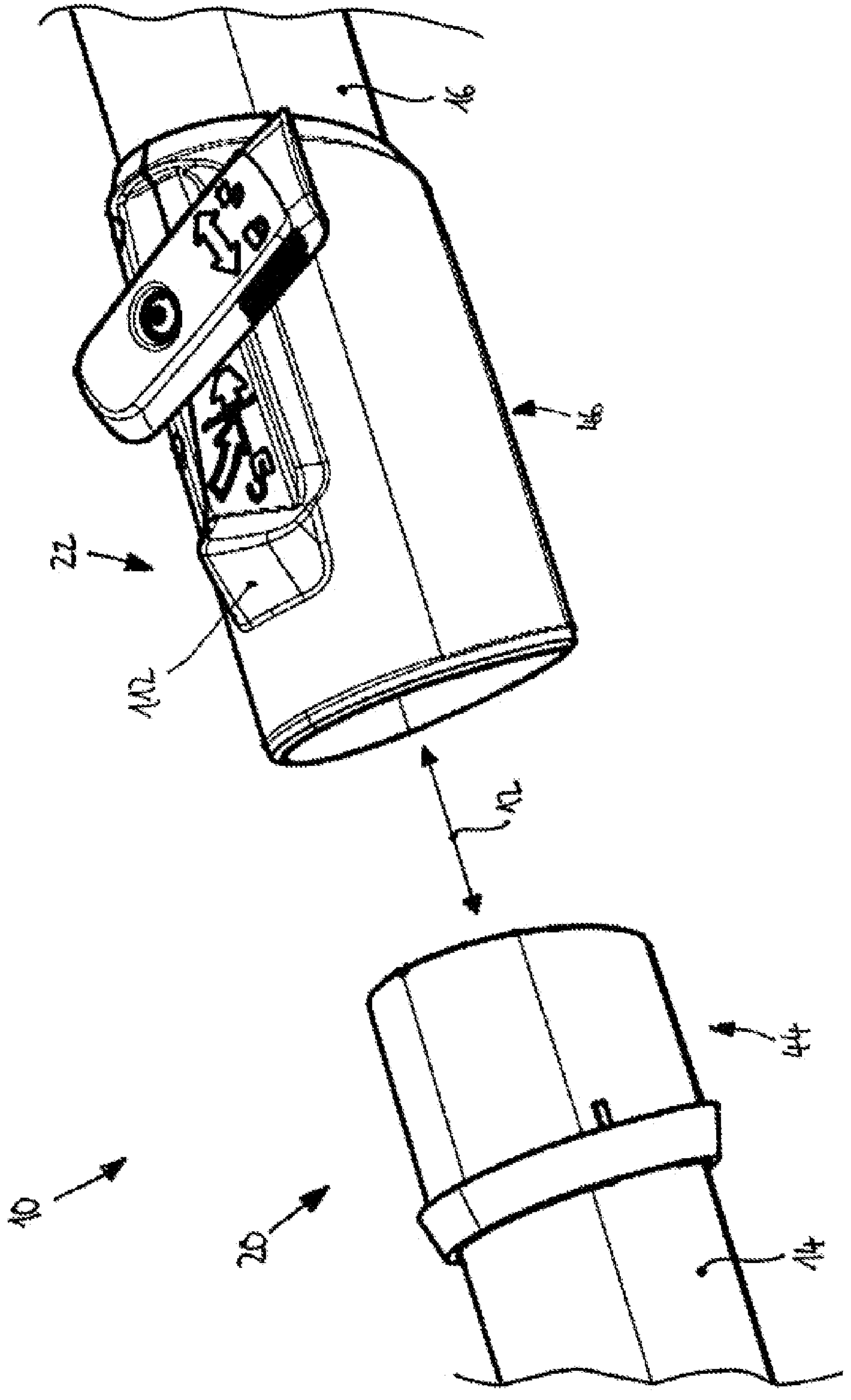
FIG. 4 is a perspective plan view of the connection sections from FIG. 3 when not plugged together.
Figure 6:
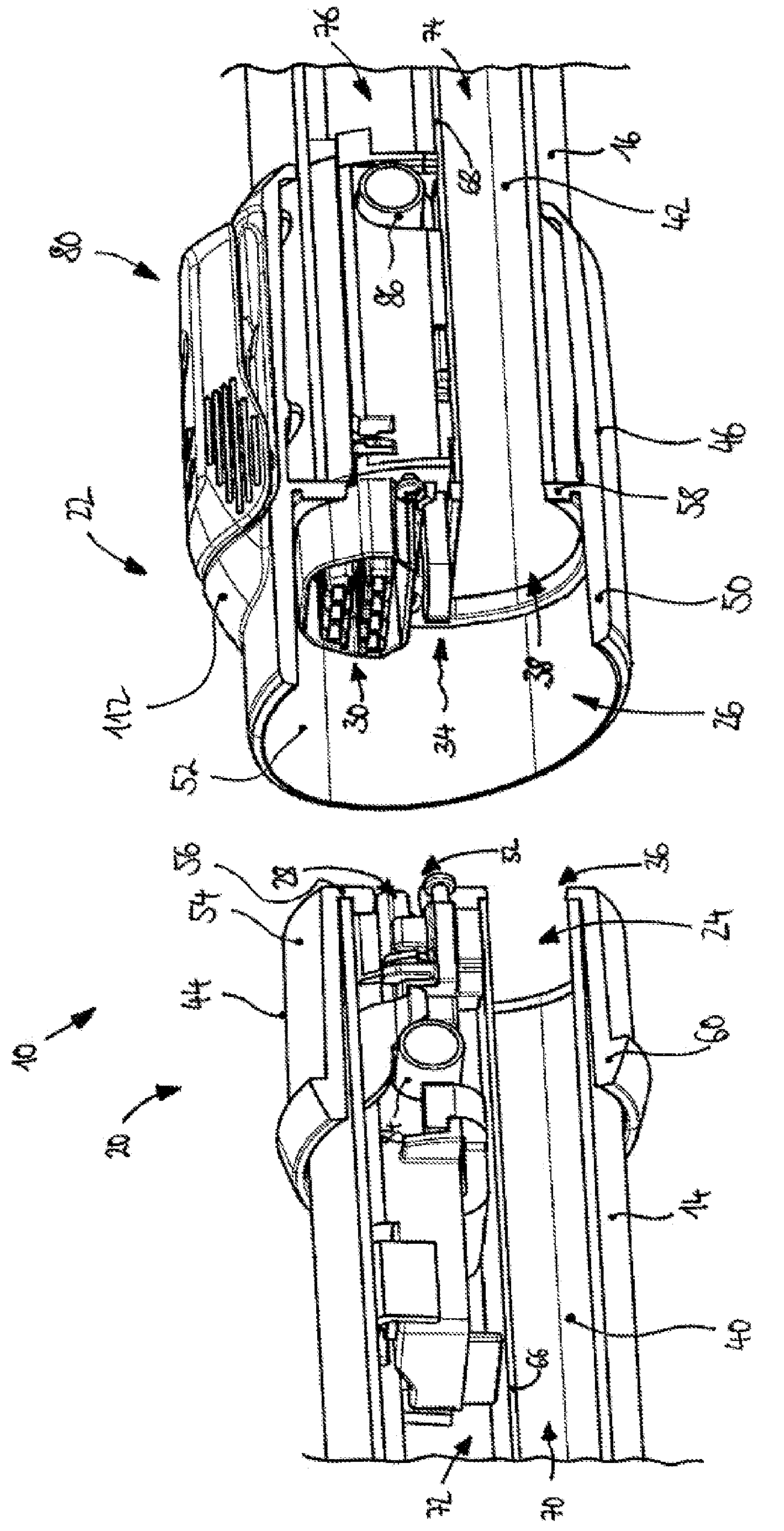
FIG. 6 is a partial longitudinal section through the connection sections and connection parts from FIG. 3.

The connection assembly 10 or a hand-guided machine tool equipped with the connection assembly 10 works as follows (explained with reference to the connection parts 14 and 16):

For the connection, the connection parts 14, 16 are first positioned relative to one another in such a way that the connection sections 20, 22 are aligned with one another in such a way that the connection sections 20, 22 can be plugged together (cf., for example, FIG. 4, 6 or 11).

Figure 3:
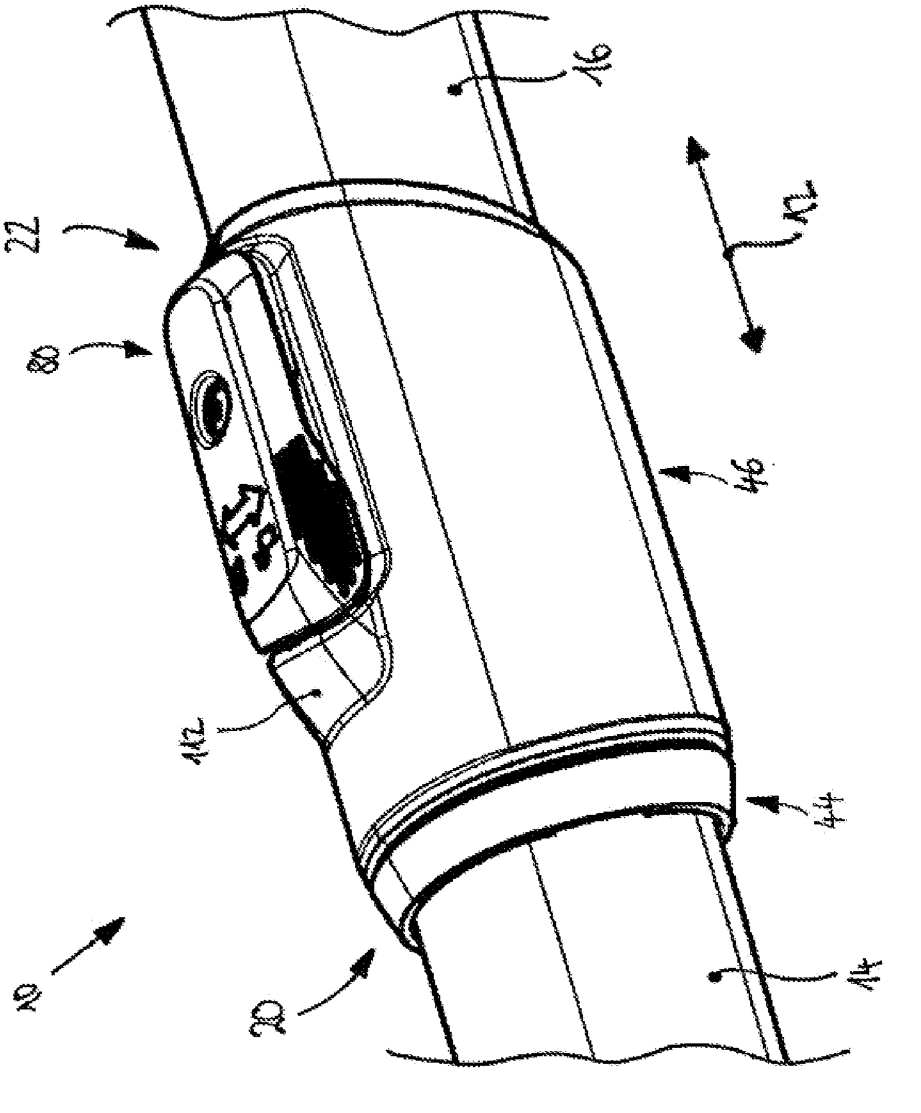
FIG. 3 is an enlarged view of two plugged together connection sections of two adjacent connection parts according to detail A in FIG. 2.

The connection sections 20, 22 are then plugged together and the clamping lever 80 can be closed (cf., for example, FIG. 3 or 9). Once the connection segments are plugged together, the clamping element 34 and the counter element 32 come into engagement with one another (behind one another), since the clamping element 34 is biased relative to the counter element 32 by the spring 92 (cf., for example, FIG. 8).

In addition, the plug connectors 28, 30 are also connected to one another when the connection sections are plugged together. If an end position is reached when the connection sections are plugged together, for example when the resting section 56 of the connection section 20 comes into contact with the resting section 58 of the connection section 22, the connection openings 36, 38 are also aligned with one another in such a way that the flow channel 40 and the flow channel 42 are flow-connected to one another.

By pivoting the clamping lever 80, the clamping device 82 is actuated, which device acts on the clamping element 34, which clamping element engages with the counter element 32 from behind (see FIG. 9). The clamping element 34 is thereby pulled inward (axially) in the longitudinal direction 12 by means of the eccentric 102 in the connection part 16. As a result of the connection parts 14, 16 resting against one another at the connection sections 20, 22, for example by means of the task sections 56, 58, and the clamping element 34 applying a tensile force to the counter element 32, the connection parts 14, 16 are clamped together.

In this state, an electrical plug connection is established between the plug connectors 28, 30. A mechanical clamping connection is established by the counter element 32 and the clamping element 34. A flow connection is also established between the connection parts 14, 16 by the mutually aligned connection openings 36, 38.

For the detachment, the clamping lever 80 has to be pivoted in the opening direction, as a result of which the clamping device 82 is actuated and the clamping element 34 is released (tensile force is relieved). The clamping element 34 and the counter element 32 are still engaged behind one another.

In order to bring the clamping element 34 and the counter element 32 out of engagement, the clamping lever 80 has to be pivoted further in the opening direction or, alternatively, the pushbutton 104 has to be operated. As a result, the clamping element 34 is pivoted in such a way that it is disengaged from the counter element 32. The mechanical clamping connection is thus released.

The connection parts 14, 16 can then be separated from one another or pulled apart. By separating the electrical plug connectors 28, 20 and the connection openings 26, 38, the electrical plug connection and the flow connection between the connection parts 14, 16 are also released.

The invention claimed is:

1. Connection assembly for connecting a tool head and a further machine module of a hand-guided machine tool, wherein the connection assembly comprises at least two connection parts following one another along a longitudinal axis and each having a connection section via which the connection parts are connectable to one another, wherein the connection sections each delimit an inner cross section to the outside such that an inner chamber having a volume is formed, characterized in that inside the volume of the inner chamber of the connection section of a first of the connection parts a mechanical clamping element is arranged and inside the volume of the inner chamber of the connection section of the other connection part a mechanical counter element is arranged, wherein on the connection section of the first connection part an actuatable clamping device is provided that acts on the clamping element, wherein the clamping element and the counter element are configured in such a way that they can be brought into engagement with one another when the connection sections are plugged together and wherein, by actuating the clamping device, the connection parts are braceable against one another when the clamping element is in engagement with the counter element, and wherein the mechanical clamping element is wholly enclosed within the volume of the chamber when the mechanical clamping element is in engagement and out of engagement with the mechanical counter element, wherein the counter element is displaceably guided on the second connection part and is mounted on the second connection part or on the connection section of the second connection part by interposition of a spring, wherein the counter element is coupled to or merges with a retaining portion, wherein the retaining portion includes an angled portion, and wherein the spring is disposed between the angled portion and the transverse bolt on the second connection part.

2. Connection assembly according to claim 1, wherein the connection parts are detachably connectable to each other.

3. Connection assembly according to claim 1, wherein the clamping device has a manually operable clamping lever and is configured in such a way that, for clamping the connection parts via the clamping element and counter element, only this clamping lever has to be operated.

4. Connection assembly according to claim 1, wherein the clamping element is rotatably mounted on the clamping device and is biased relative to the counter element, so that the clamping element and the counter element automatically engage with each other when the connection sections are plugged together.

5. Connection assembly according to claim 1, wherein the clamping element is fixed to the first connection part and/or the counter element is fixed to the second connection part by means of a transverse bolt respectively, wherein the transverse bolt projects transversely or obliquely to the longitudinal axis through the cross section of the respective connection part and engages with its ends in a recess formed in the wall of the connection part or in a passage formed in the wall of the connection part respectively.

6. Connection assembly according to claim 5, wherein the clamping device comprises a bearing part which wraps around the transverse bolt of the first connection part and defines a bearing point spaced from the transverse bolt and having a bearing axis oriented obliquely or orthogonally to the central longitudinal axis of the transverse bolt.

7. Connection assembly according to claim 6, wherein the clamping lever is pivotably mounted on the bearing point of the bearing part via a lever shaft, wherein the clamping element is coupled to the lever shaft by means of an eccentric.

8. Connection assembly according to claim 1, wherein at the connection portion of the first connection part a manually operable pushbutton is provided, which acts on the clamping element, wherein by operating the pushbutton the clamping element and the counter element can be disengaged.

9. Connection assembly according to claim 1, wherein the clamping device is configured in such a way that, after the clamping element has been released, the clamping lever can be moved further in the opening direction in order to disengage the clamping element and the counter element.

10. Connection assembly according to claim 1, wherein on the connection section of the first connection part a projection is formed, that, when the clamping lever is in the position in which the clamping element is braced, adjoins a free end of the clamping lever.

11. Connection assembly according to claim 1, wherein an electrical plug connector and/or a connection opening to a flow channel formed in the respective connection part is arranged on the connection sections respectively, wherein the plug connector and/or the connection opening is arranged within the cross section of the respective connection section.

12. Connection assembly according to claim 11, wherein one or more dust removal openings are formed in the plug connector adjacent to its plug contacts.

13. Connection assembly according to claim 1, wherein at least one of the plug connectors is mounted on the connection section or on the connection part via an elastic element respectively.

14. Connection assembly according to claim 13, wherein the plug connector is returnable by the elastic element into a central, initial position.

15. Connection assembly according to claim 1, wherein the connection section of the first connection part has a collar projecting parallel to the longitudinal axis, with which the collar of the connection section of the first connection part encompasses the connection section of the other connection part when plugged together.

16. Connection assembly according to claim 1, wherein a further connection part is provided, which has a connection portion at both ends respectively in such a way that the further connection part can be inserted as an extension piece between the first and the second connection part and can be detachably connected thereto.

17. Machine tool comprising a tool head, a further machine module and a connection assembly for connecting the tool head and the further machine module, wherein the connection assembly comprises at least two connection parts following one another along a longitudinal axis and each having a connection section via which the connection parts are connectable to one another, wherein the connection sections each delimit an inner cross section to the outside such that an inner chamber having a volume is formed, characterized in that inside the volume of the inner chamber of the connection section of a first of the connection parts a mechanical clamping element is arranged and inside the volume of the inner chamber of the connection section of the other connection part a mechanical counter element is arranged, wherein on the connection section of the first connection part an actuatable clamping device is provided that acts on the clamping element, wherein the clamping element and the counter element are configured in such a way that they can be brought into engagement with one another when the connection sections are plugged together and wherein, by actuating the clamping device, the connection parts are braceable against one another when the clamping element is in engagement with the counter element and wherein the mechanical clamping element is wholly enclosed within the volume of the chamber when the mechanical clamping element is in engagement and out of engagement with the mechanical counter element, wherein the counter element is displaceably guided on the second connection part and is mounted on the second connection part or on the connection section of the second connection part by interposition of a spring, wherein the counter element is coupled to or merges with a retaining portion, wherein the retaining portion includes an angled portion, and wherein the spring is disposed between the angled portion and the transverse bolt on the second connection part.

18. Extension piece for a connection assembly for connecting a tool head and a further machine module of a hand-guided machine tool, wherein the connection assembly comprises at least two connection parts following one another along a longitudinal axis and each having a connection section via which the connection parts are connectable to one another, wherein the connection sections each delimit an inner cross section to the outside such that an inner chamber having a volume is formed, characterized in that inside the volume of the inner chamber of the connection section of a first of the connection parts a mechanical clamping element is arranged and inside the volume of the inner chamber of the connection section of the other connection part a mechanical counter element is arranged, wherein on the connection section of the first connection part an actuatable clamping device is provided that acts on the clamping element, wherein the clamping element and the counter element are configured in such a way that they can be brought into engagement with one another when the connection sections are plugged together and wherein, by actuating the clamping device, the connection parts are braceable against one another when the clamping element is in engagement with the counter element, and wherein the mechanical clamping element is wholly enclosed within the volume of the chamber when the mechanical clamping element is in engagement and out of engagement with the mechanical counter element, wherein the counter element is displaceably guided on the extension piece and is mounted on the extension piece or on the second connection section of the extension piece by interposition of a spring, wherein the counter element is coupled to or merges with a retaining portion, wherein the retaining portion comprises an angled portion and wherein the spring is arranged between the angled portion and the transverse bolt at the second connection portion of the extension piece.

19. Extension piece according to claim 18, wherein the clamping element is configured such that, when the first connection section is plugged together with a connection section of a second connection part of the connection assembly, the clamping element is engageable with a counter element of the connection section, wherein, by actuating the clamping device, the extension piece is braceable against the connection part when the clamping element engages with the counter element.

20. Extension piece according to claim 18, characterized in that the connection sections of the extension piece are formed complementarily to one another.

21. Extension piece according to claim 18, wherein the clamping device has a manually operable clamping lever and is configured in such a way that, for clamping the extension piece to one of the connection parts via the clamping element and counter element, only this clamping lever has to be operated.

22. Extension piece according to claim 21, wherein the clamping lever is pivotably mounted on the bearing point of the bearing part via a lever shaft, wherein the clamping element is coupled to the lever shaft by means of an eccentric.

23. Extension piece according to claim 18, wherein the clamping element is rotatably mounted on the clamping device and biased so that the clamping element automatically engages a counter element of the connection part when the extension piece is plugged together with a connection part of the connection assembly.

24. Extension piece according to claim 18, wherein the clamping element and/or the counter element are each fixed to the extension piece via a transverse bolt, wherein the transverse bolt projects transversely or obliquely to the longitudinal axis through the cross-section of the extension piece and engages with its ends in a recess formed in the wall of the extension piece or in a passage formed in the wall of the extension piece respectively.

25. Extension piece according to claim 18, wherein the clamping device has a bearing part which wraps around the transverse bolt of the extension piece and defines a bearing point spaced apart from the transverse bolt and having a bearing axis oriented obliquely or orthogonally to the central longitudinal axis of the transverse bolt.

26. Extension piece according to claim 18, wherein at the connection section a manually operable pushbutton is provided, that acts on the clamping element, wherein by operating the pushbutton the clamping element can be brought out of engagement with the counter element of a connection part of the connection assembly and/or in that the clamping device is configured in such a way that the clamping lever, after the clamping element has been released, can be moved further in the opening direction in order to bring the clamping element out of engagement with the counter element of a connection part of the connection assembly.

27. Extension piece according to claim 18, wherein in the connection sections an electrical plug connector and/or a connection opening to a flow channel formed in the extension piece are arranged respectively, wherein the plug connector and/or the connection opening are arranged inside the cross section of the respective connection section.

28. Extension piece according to claim 27, wherein at least one of the plug connectors is mounted on the connection section or on the extension piece, respectively, via a resilient element, so that the plug connector is movable relative to the connection section or to the extension piece.

29. Extension piece for a connection assembly for connecting a tool head and a further machine module of a hand-guided machine tool, wherein the extension piece has at both ends a respective connection section, via which the extension piece is connectable to a connection part of the connection assembly respectively, wherein the connection sections of the extension piece each delimit an inner cross-section towards the outside such that an inner chamber having a volume is formed, characterized in that inside the volume of the inner chamber of the first connection section a mechanical clamping element is arranged and inside the volume of the inner chamber of the second connection section a mechanical counter element is arranged, wherein on the first connection section an actuatable clamping device is provided that acts on the clamping element, and wherein the mechanical clamping element is wholly enclosed within the volume of the chamber when the mechanical clamping element is in engagement and out of engagement with the mechanical counter element of the connection part, wherein the counter element is displaceably guided on the second connection part and is mounted on the second connection part or on the connection section of the second connection part by interposition of a spring, wherein the counter element is coupled to or merges with a retaining portion, where in the retaining portion includes an angled portion, and wherein the spring is disposed between the angled portion and the transverse bolt on the second connection part.

* * * * *